United States Patent
Irie et al.

(10) Patent No.: US 10,079,973 B2
(45) Date of Patent: Sep. 18, 2018

(54) IMAGING DEVICE OPERATION DEVICE, OPERATION METHOD, AND PROGRAM

(71) Applicant: FUJIFILM Corporation, Tokyo (JP)

(72) Inventors: Fuminori Irie, Saitama (JP); Mikio Watanabe, Saitama (JP); Takeshi Misawa, Saitama (JP); Masaya Tamaru, Saitama (JP); Daisuke Hayashi, Saitama (JP); Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 59 days.

(21) Appl. No.: 15/432,161

(22) Filed: Feb. 14, 2017

(65) Prior Publication Data

US 2017/0155828 A1 Jun. 1, 2017

Related U.S. Application Data

(63) Continuation of application No. PCT/JP2015/067870, filed on Jun. 22, 2015.

(30) Foreign Application Priority Data

Sep. 5, 2014 (JP) .................................. 2014-181035

(51) Int. Cl.
*H04N 5/232* (2006.01)
*G08B 13/196* (2006.01)
*G06F 3/0488* (2013.01)

(52) U.S. Cl.
CPC ..... *H04N 5/23216* (2013.01); *H04N 5/23293* (2013.01); *H04N 5/23296* (2013.01);
(Continued)

(58) Field of Classification Search
None
See application file for complete search history.

(56) References Cited

U.S. PATENT DOCUMENTS

| 7,839,926 B1* | 11/2010 | Metzger ................ H04N 5/144 375/240.01 |
| 2011/0085016 A1* | 4/2011 | Kristiansen ......... G06F 3/04883 348/14.03 |

(Continued)

FOREIGN PATENT DOCUMENTS

| JP | 8-237533 A | 9/1996 |
| JP | 2001-136514 A | 5/2001 |

(Continued)

OTHER PUBLICATIONS

English Translation of the International Preliminary Report on Patentability and Written Opinion dated Mar. 7, 2017 in PCT/JP2015/067870.

(Continued)

*Primary Examiner* — Roberto Velez
*Assistant Examiner* — Quan Pham
(74) *Attorney, Agent, or Firm* — Birch, Stewart, Kolasch & Birch, LLP

(57) ABSTRACT

Provided are an imaging device operation device, an operation method, and a program that can simply and rapidly operate a pan/tilt mechanism such that an imaging unit is located at a desired position. A pan/tilt operation device includes a touch panel in which a touch centering detection region is set, predetermined pan angle rotation instruction regions are set on the left and right sides of the touch centering detection region, and predetermined tilt angle rotation instruction regions are set on the upper and lower sides of the touch centering detection region, a touch centering instruction unit, a predetermined pan angle rotation instruction unit that outputs an instruction to pan a pan/tilt mechanism at a predetermined pan angle, and a predetermined tilt angle rotation instruction unit that outputs an (Continued)

instruction to tilt the pan/tilt mechanism at a predetermined tilt angle.

14 Claims, 12 Drawing Sheets

(52) U.S. Cl.
CPC ...... *G06F 3/04883* (2013.01); *G06F 3/04886* (2013.01); *G08B 13/1963* (2013.01); *H04N 5/23206* (2013.01); *H04N 5/23238* (2013.01)

(56) References Cited

U.S. PATENT DOCUMENTS

| | | | |
|---|---|---|---|
| 2013/0235248 A1 | 9/2013 | Suzuki et al. | |
| 2014/0368621 A1* | 12/2014 | Michiyama | H04N 5/23216 |
| | | | 348/50 |

FOREIGN PATENT DOCUMENTS

| | | | |
|---|---|---|---|
| JP | 2008-17513 A | 1/2008 | |
| JP | 2006-244154 A | 9/2008 | |
| JP | 2008-236765 A | 10/2008 | |
| JP | 2009-10774 A | 1/2009 | |

OTHER PUBLICATIONS

International Search Report for PCT/JP2015/067870 (PCT/ISA/210) dated Aug. 11, 2015.
Written Opinion of the International Searching Authority for PCT/JP2015/067870 (PCT/ISA/210) dated Aug. 11, 2015.

* cited by examiner

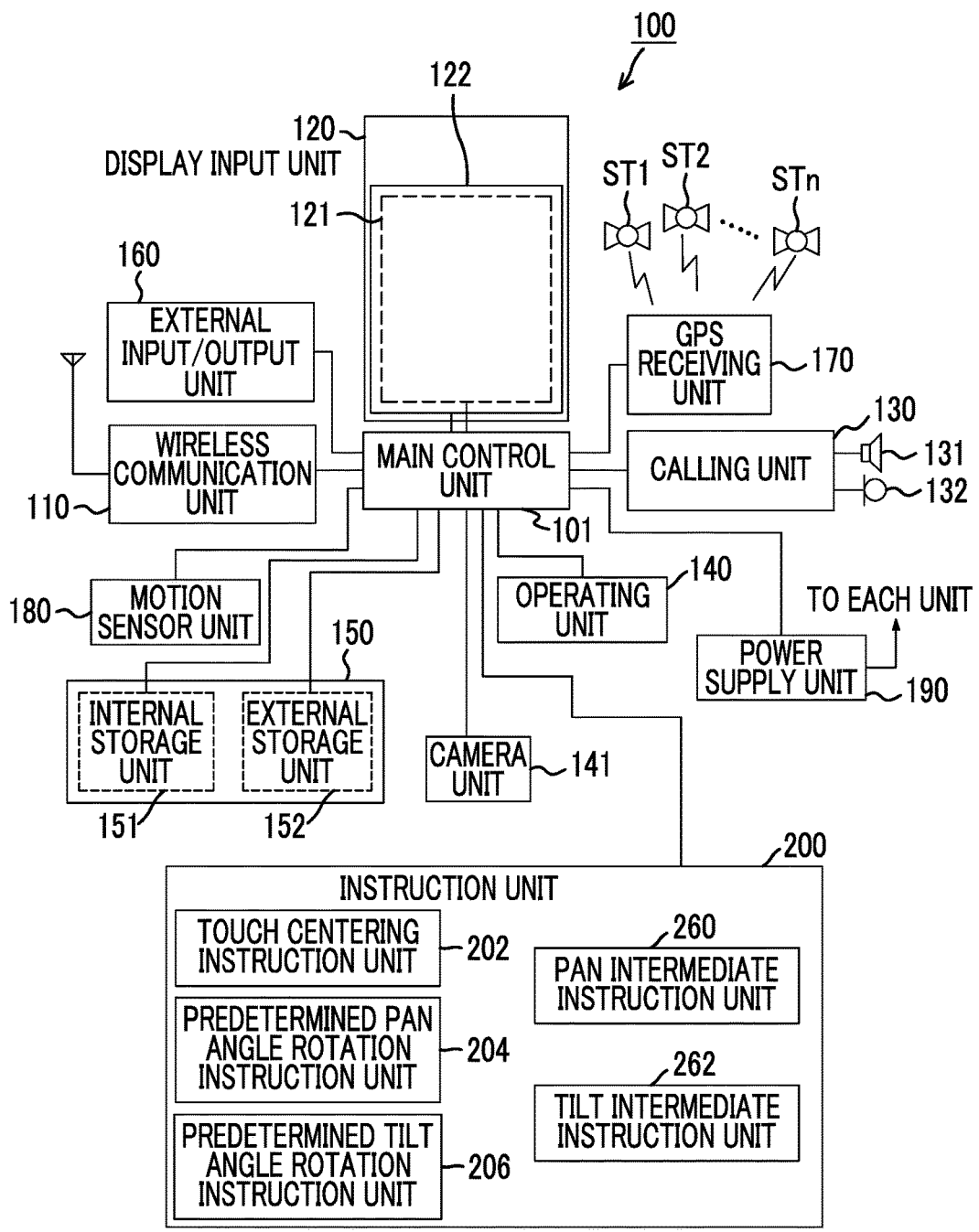

IMAGING DEVICE OPERATION DEVICE, OPERATION METHOD, AND PROGRAM

CROSS-REFERENCE TO RELATED APPLICATIONS

This application is a Continuation of PCT International Application No. PCT/JP2015/067870 filed on Jun. 22, 2015, which claims priority under 35 U.S.C. § 119(a) to Japanese Patent Application No. 2014-181035 filed on Sep. 5, 2014. Each of the above applications is hereby expressly incorporated by reference, in their entirety, into the present application.

BACKGROUND OF THE INVENTION

1. Field of the Invention

The present invention relates to an imaging device operation device, an operation method, and a program, and more particularly, to an operation device, an operation method, and a program that pan and tilt an imaging device (pan/tilt camera) at a predetermined angle.

2. Description of the Related Art

In recent years, a technique has been known in which a preview image captured by an imaging device is displayed on a display unit provided with a touch panel and a user touches the touch panel to operate the imaging device while seeing the preview image displayed on the display unit.

JP2008-236765A and JP2008-017513A disclose an imaging device in which an image monitor, which is a display unit, is provided on the rear surface of the imaging device and an instruction receiving unit formed by a touch pad or a touch panel is provided in the periphery of the image monitor. In the techniques disclosed in JP2008-236765A and JP2008-017513A, a zoom operation of the imaging device is performed in response to an instruction which is received by the touch pad or the touch panel.

JP2009-010774A discloses a technique in which different operations of an imaging device are allocated to each region of a touch panel and a user changes a touch region to operate the imaging device.

JP2006-244154A discloses a technique in which a dead region (dead zone) is provided on a touch panel to prevent an erroneous input or an erroneous operation due to the touch of a region that is not intended by a user.

A pan/tilt camera in which a pan/tilt mechanism is provided in an imaging device can capture images in a wide range using the pan/tilt mechanism even if it is installed at a fixed point. Therefore, the pan/tilt camera is used in a case in which an image of a moving object is captured or a case in which an image is captured in a wide range.

SUMMARY OF THE INVENTION

In the technical field of the pan/tilt camera, improving the operability of the pan/tilt mechanism is one of the important challenges.

As a method for improving the operability of the pan/tilt mechanism, for example, a method is considered which displays a preview image captured by a pan/tilt camera on a display unit provided with a touch panel and operates a pan/tilt mechanism such that a touch position on the preview image is located at the center of the display unit (a method having a touch centering function). According to this method, a user can touch a portion of the preview image displayed on the display unit to simply operate the pan/tilt mechanism.

However, the touch centering function can simply operate the pan/tilt mechanism in the range of the preview image displayed on the display unit. However, in some cases, when the pan/tilt mechanism is operated such that a position outside the range of the preview image displayed on the display unit is located at the center, it takes a lot of time and effort to perform the operation. That is, in a case in which the user operates the pan/tilt mechanism such that a position outside the range of the preview image is located at the center of the display unit, the user needs to use the touch centering function a plurality of times to operate the pan/tilt mechanism.

JP2008-236765A, JP2008-017513A, JP2009-010774A, and JP2006-244154A do not disclose a technique related to the pan/tilt camera and a technique related to the operation of the pan/tilt mechanism.

The invention has been made in view of the above-mentioned problems and an object of the invention is to provide an imaging device operation device, an operation method, and a program that can simply and rapidly operate a pan/tilt mechanism such that an imaging unit is located at a desired position.

According to an aspect of the invention, there is provided an imaging device operation device which is a pan/tilt operation device and manually pans and tilts an imaging device (pan/tilt camera) comprising an imaging unit including an imaging lens and an imaging element and a pan/tilt mechanism that rotates the imaging unit in a horizontal direction and a vertical direction with respect to a device body. The imaging device operation device comprises: a display unit; a touch panel which detects the coordinates of a touch position on the display unit and in which a touch centering detection region is set in a central portion of a region corresponding to the display unit on which a live view image captured by the imaging unit is displayed, predetermined pan angle rotation instruction regions are set on the left and right sides of the touch centering detection region, and predetermined tilt angle rotation instruction regions are set on the upper and right sides of the touch centering detection region; a display control unit that outputs the live view image to the display unit; a touch centering instruction unit that outputs an instruction to pan and tilt the pan/tilt mechanism such that a point corresponding to the detected coordinates on the live view image is located at the center of the live view image when the coordinates of the touch position in the touch centering detection region are detected; a predetermined pan angle rotation instruction unit that outputs an instruction to pan the pan/tilt mechanism at a predetermined pan angle when the coordinates of the touch position in the predetermined pan angle rotation instruction region are detected; and a predetermined tilt angle rotation instruction unit that outputs an instruction to tilt the pan/tilt mechanism at a predetermined tilt angle when the coordinates of the touch position in the predetermined tilt angle rotation instruction region are detected.

According to this aspect, when a touch is detected in the touch centering detection region, the touch centering instruction unit operates the pan/tilt mechanism in the display range of the live view image. In addition, according to this aspect, when a touch is detected in the predetermined pan angle rotation instruction region, the predetermined pan angle rotation instruction unit can pan the pan/tilt mechanism at a predetermined pan angle. When a touch is detected in the predetermined tilt angle rotation instruction region, the predetermined tilt angle rotation instruction unit can tilt the pan/tilt mechanism at a predetermined tilt angle. Therefore, according to this aspect, it is possible to simply and rapidly operate the pan/tilt mechanism at a desired rotation angle.

Preferably, the operation device further comprises a zoom value acquisition unit that acquires a zoom value of an optical zoom of the imaging unit or a zoom value of an electronic zoom of the live view image and a first angle change unit that changes the predetermined pan angle and the predetermined tilt angle according to the zoom value acquired by the zoom value acquisition unit. Preferably, the predetermined pan angle rotation instruction unit outputs an instruction to pan the pan/tilt mechanism at the predetermined pan angle changed by the first angle change unit, and the predetermined tilt angle rotation instruction unit outputs an instruction to tilt the pan/tilt mechanism at the predetermined tilt angle changed by the first angle change unit.

According to this aspect, the predetermined pan angle and the predetermined tilt angle are changed according to the zoom value of the optical zoom or the electronic zoom. Therefore, even in a case in which the angle of view displayed on the display unit is changed by the optical zoom or the electronic zoom, it is possible to operate the pan/tilt mechanism according to the changed angle of view.

Preferably, the operation device further comprises a touch history storage unit that stores a history of touches detected in the predetermined pan angle rotation instruction region and the predetermined tilt angle rotation instruction region and a second angle change unit that changes the predetermined pan angle and the predetermined tilt angle according to the history of the touches stored in the touch history storage unit. Preferably, the predetermined pan angle rotation instruction unit outputs an instruction to pan the pan/tilt mechanism at the predetermined pan angle changed by the second angle change unit and the predetermined tilt angle rotation instruction unit outputs an instruction to tilt the pan/tilt mechanism at the predetermined tilt angle changed by the second angle change unit.

According to this aspect, the predetermined pan angle and the predetermined tilt angle are changed according to the history of the touches detected in the predetermined pan angle rotation instruction region and the predetermined tilt angle rotation instruction region. Therefore, touch methods can be changed to operate the pan/tilt mechanism.

Preferably, first dead regions are set between the touch centering detection region and the predetermined pan angle rotation instruction regions and between the touch centering detection region and the predetermined tilt angle rotation instruction regions in the touch panel.

According to this aspect, the dead regions are set between the touch centering detection region and the predetermined pan angle rotation instruction regions from which different instructions are output and between the touch centering detection region and the predetermined tilt angle rotation instruction regions from which different instructions are output. Therefore, it is possible to prevent the region that is not intended by the user from being erroneously touched.

Preferably, pan intermediate instruction regions are set between the touch centering detection region and the predetermined pan angle rotation instruction regions and tilt intermediate instruction regions are set between the touch centering detection region and the predetermined tilt angle rotation instruction regions in the touch panel. Preferably, the operation device further comprises: a pan intermediate instruction unit that outputs an instruction to pan the pan/tilt mechanism at an intermediate pan angle that is greater than a maximum pan angle instructed by the touch centering instruction unit and is less than the predetermined pan angle when the coordinates of the touch position in the pan intermediate instruction region are detected; and a tilt intermediate instruction unit that outputs an instruction to tilt the pan/tilt mechanism at an intermediate tilt angle that is greater than a maximum tilt angle instructed by the touch centering instruction unit and is less than the predetermined tilt angle when the coordinates of the touch position in the tilt intermediate instruction region are detected.

According to this aspect, the intermediate instruction regions which receive an instruction for an intermediate rotation angle between the rotation angle of the pan/tilt mechanism operated by touch centering and the predetermined pan angle (predetermined tilt angle) are set between the touch centering detection region and the predetermined pan angle rotation instruction regions and between the touch centering detection region and the predetermined tilt angle rotation instruction regions. Therefore, according to this aspect, the pan/tilt mechanism can be accurately operated by the intermediate pan angle and the intermediate tilt angle.

Preferably, second dead regions are set at corners of the touch panel.

According to this aspect, since the dead regions are set at the corners of the touch panel, it is possible to prevent an erroneous operation caused by the touch of the corners.

Preferably, the display control unit performs control such that the regions displayed on the display unit can be distinguished from each other.

According to this aspect, the regions are displayed such that the user recognizes the position of each region. Therefore, the position where each region is disposed is clearly checked and identified.

Preferably, in a case in which the pan/tilt mechanism is panned in response to the instruction output from the predetermined pan angle rotation instruction unit and reaches a rotation mechanical end portion in a pan direction, the display control unit displays a warning indicating that the pan/tilt mechanism reaches the rotation mechanical end portion in the pan direction on the display unit.

According to this aspect, when the pan/tilt mechanism is panned at a predetermined pan angle, a warning indicating that the pan/tilt mechanism reaches the mechanical end portion is displayed. Therefore, it is possible to inform the mechanical end portion of the pan/tilt mechanism in advance.

Preferably, in a case in which it is determined that the pan/tilt mechanism is panned in a direction opposite to a direction instructed by an operation of the touch panel to execute an instruction received through the predetermined pan angle rotation instruction region, the predetermined pan angle rotation instruction unit outputs an instruction to pan the pan/tilt mechanism in the opposite direction to execute the instruction received through the predetermined pan angle rotation instruction region.

According to this aspect, even in a case in which it is difficult to execute the received instruction due to the mechanical end portion of the pan/tilt mechanism, the pan/tilt mechanism can be operated in a direction opposite to the instructed pan operation direction to execute the received instruction.

Preferably, the predetermined pan angle rotation instruction region receives instructions in different ways in a case in which the predetermined pan angle rotation instruction unit outputs an instruction to pan the pan/tilt mechanism in a direction instructed by the operation of the touch panel and a case in which the predetermined pan angle rotation instruction unit outputs an instruction to pan the pan/tilt mechanism in a direction opposite to the direction instructed by the operation of the touch panel.

According to this aspect, instructions are received in different ways in a case in which the pan/tilt mechanism is panned in the instructed direction to execute the instruction and a case in which the pan/tilt mechanism is panned in a direction opposite to the instructed direction to execute the instruction. Therefore, according to this aspect, it is possible to select an operation which pans the pan/tilt mechanism in the instructed direction to execute the instruction and an operation which pans the pan/tilt mechanism in the direction opposite to the instructed direction to execute the instruction.

Preferably, in a case in which the imaging unit captures a moving image, the predetermined pan angle rotation instruction unit pans the pan/tilt mechanism only in the direction instructed by the operation of the touch panel.

According to this aspect, in a case in which a moving image is captured, the pan/tilt mechanism is rotated only in the instructed direction. Therefore, it is possible to prevent an unnatural pan operation during the capture of a moving image and to capture a natural moving image.

According to another aspect of the invention, there is provided an operation method which manually pans and tilts an imaging device comprising an imaging unit including an imaging lens and an imaging element and a pan/tilt mechanism that rotates the imaging unit in a horizontal direction and a vertical direction with respect to a device body. The method comprises: a display control step of outputting a live view image captured by the imaging unit to a display unit; a detection step of detecting the coordinates of a touch position on the display unit through a touch panel in which a touch centering detection region is set in a central portion of a region corresponding to the display unit on which the live view image is displayed, predetermined pan angle rotation instruction regions are set on the left and right sides of the touch centering detection region, and predetermined tilt angle rotation instruction regions are set on the upper and right sides of the touch centering detection region; a touch centering instruction step of outputting an instruction to pan and tilt the pan/tilt mechanism such that a point corresponding to the detected coordinates on the live view image is located at the center of the live view image when the coordinates of the touch position in the touch centering detection region are detected; a predetermined pan angle rotation instruction step of outputting an instruction to pan the pan/tilt mechanism at a predetermined pan angle when the coordinates of the touch position in the predetermined pan angle rotation instruction region are detected; and a predetermined tilt angle rotation instruction step of outputting an instruction to tilt the pan/tilt mechanism at a predetermined tilt angle when the coordinates of the touch position in the predetermined tilt angle rotation instruction region are detected.

According to still another aspect of the invention, there is provided a program that causes a computer to perform an operation method which manually pans and tilts an imaging device comprising an imaging unit including an imaging lens and an imaging element and a pan/tilt mechanism that rotates the imaging unit in a horizontal direction and a vertical direction with respect to a device body. The operation method includes: a display control step of outputting a live view image captured by the imaging unit to a display unit; a detection step of detecting the coordinates of a touch position on the display unit through a touch panel in which a touch centering detection region is set in a central portion of a region corresponding to the display unit on which the live view image is displayed, predetermined pan angle rotation instruction regions are set on the left and right sides of the touch centering detection region, and predetermined tilt angle rotation instruction regions are set on the upper and right sides of the touch centering detection region; a touch centering instruction step of outputting an instruction to pan and tilt the pan/tilt mechanism such that a point corresponding to the detected coordinates on the live view image is located at the center of the live view image when the coordinates of the touch position in the touch centering detection region are detected; a predetermined pan angle rotation instruction step of outputting an instruction to pan the pan/tilt mechanism at a predetermined pan angle when the coordinates of the touch position in the predetermined pan angle rotation instruction region are detected; and a predetermined tilt angle rotation instruction step of outputting an instruction to tilt the pan/tilt mechanism at a predetermined tilt angle when the coordinates of the touch position in the predetermined tilt angle rotation instruction region are detected.

According to the invention, when a desired object of a live view image displayed in the touch centering detection region is touched, the pan/tilt mechanism can be operated such that the desired object is located at the center of the image. In addition, the predetermined pan angle rotation instruction regions or the predetermined tilt angle rotation instruction regions provided outside the touch centering detection region are touched one time to operate the pan/tilt mechanism at a predetermined pan angle or a predetermined tilt angle. Therefore, it is possible to simply and rapidly operate the pan/tilt mechanism at a desired angle.

BRIEF DESCRIPTION OF THE DRAWINGS

FIG. 13 is a block diagram illustrating an example of the internal structure of a smart phone according to a fourth embodiment.

DESCRIPTION OF THE PREFERRED EMBODIMENTS

Hereinafter, embodiments of an imaging device (pan and tilt) operation device, an imaging device operation method, and a program according to the invention will be described with reference to the accompanying drawings.

(Outward Appearance of Imaging Device)

Figure 1:
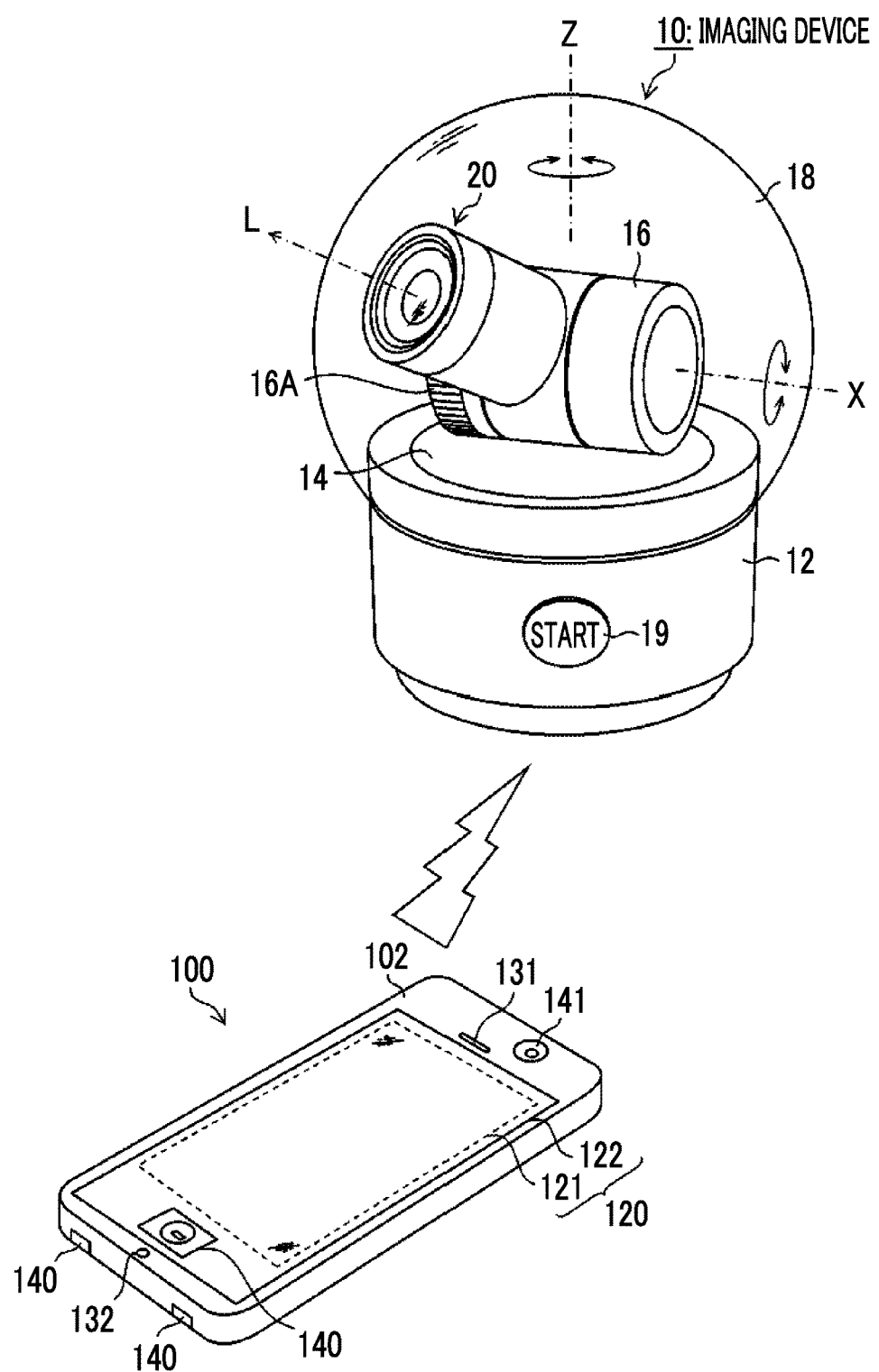
FIG. 1 is a perspective view illustrating the outward appearance of a pan/tilt operation device and an imaging device.

FIG. 1 is a perspective view illustrating the outward appearance of a pan/tilt operation device (smart phone) 100 and an imaging device 10 according to the invention. Here, the pan/tilt operation device 100 is used to operate a pan/tilt camera (imaging device) 10. FIG. 1 illustrates an example in which the pan/tilt operation device 100 operates the imaging device 10 remotely (through wireless communication). However, the invention is not limited thereto. The pan/tilt operation device 100 may be connected to the imaging device 10 in a wired manner or may be integrated with the imaging device 10.

The imaging device 10 mainly includes a device body 12, a base 14, a holding portion 16 which is fixed to the base 14 and holds an imaging unit 20 so as to be rotatable, and a dome cover 18 which covers the imaging unit 20.

Figure 2:
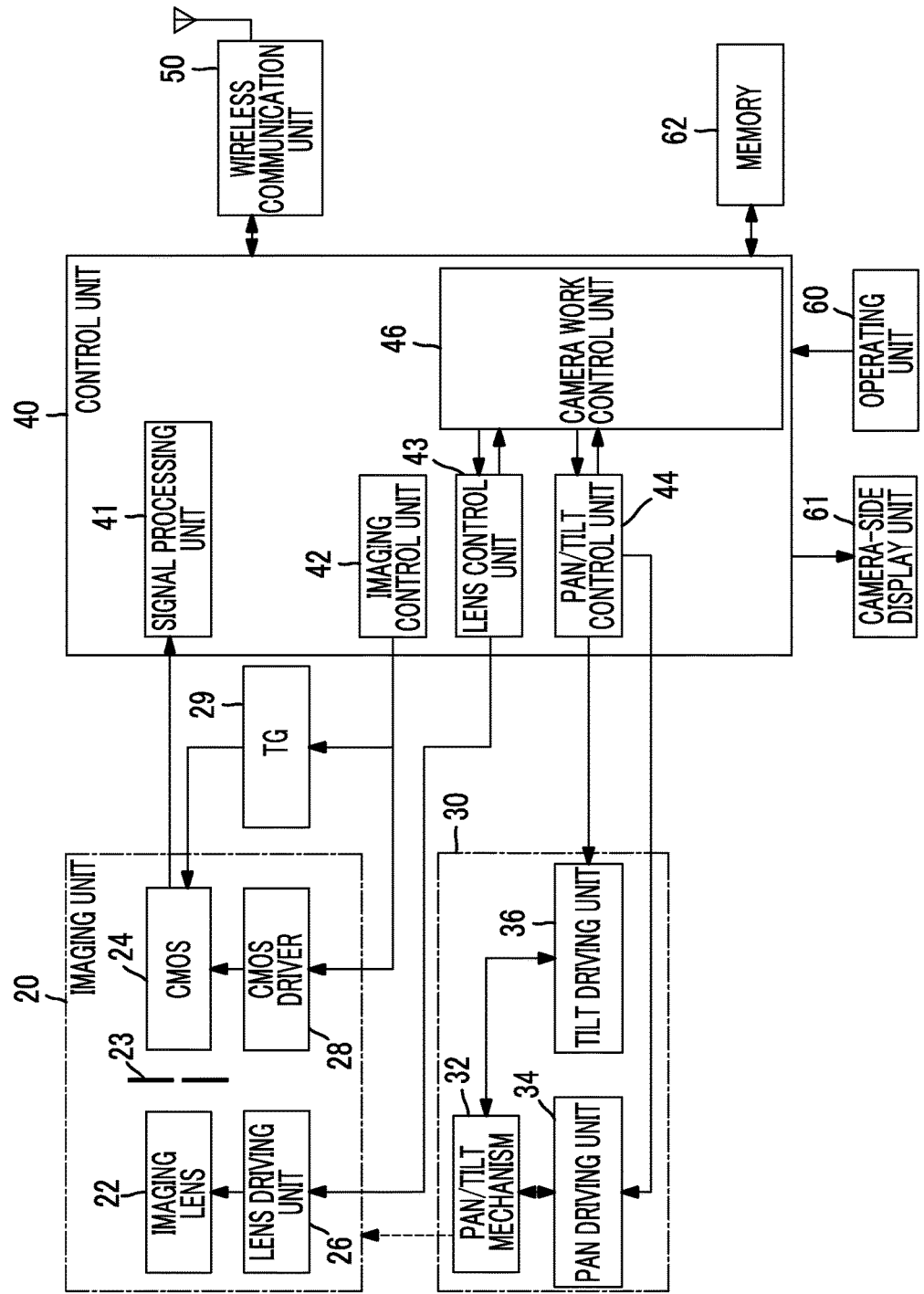
FIG. 2 is a block diagram illustrating an example of the internal structure of the imaging device.

The base 14 is provided so as to be rotatable on the axis of the vertical direction Z of the device body 12 and is rotated on the axis of the vertical direction Z by a pan driving unit 34 (FIG. 2).

The holding portion 16 includes a gear 16A that is provided on the same axis as the horizontal direction X. Driving force is transmitted from a tilt driving unit 36 (FIG. 2) through the gear 16A to rotate (tilt) the imaging unit 20 in the vertical direction.

The dome cover 18 is a dustproof and drip-proof cover and preferably has a dome shape which has a predetermined thickness and has, as a center of curvature, an intersection point between the axis of the horizontal direction X and the axis of the vertical direction Z such that the optical performance of the imaging unit 20 does not change, regardless of an optical axis direction L of the imaging unit 20.

It is preferable to provide a tripod attachment portion (for example, tripod screws) (not illustrated) on the rear surface of the device body 12.

The imaging device 10 is provided with an imaging start button 19 that instructs to start imaging and a power switch (not illustrated). The imaging device 10 includes a wireless communication unit 50 (FIG. 2) and mainly receives various types of operation instructions from an external terminal (a smart phone 100 in this example) using wireless communication with the smart phone 100.

(Internal Structure of Imaging Device)

FIG. 2 is a block diagram illustrating an example of the internal structure of the imaging device 10.

The imaging device 10 can capture both still images and moving images and mainly comprises the imaging unit 20, a pan/tilt device 30, a control unit 40, and the wireless communication unit 50.

The imaging unit 20 includes, for example, an imaging lens 22 and an imaging element 24. The imaging lens 22 is a prime lens or a zoom lens and forms an object image on an imaging surface of the imaging element 24. A focus lens, a variable magnification lens (in the case of a zoom lens), and a diaphragm 23 included in the imaging lens 22 are driven by a lens driving unit 26.

In this example, the imaging element 24 is a color imaging element in which color filters of three primary colors, that is, red (R), green (G), and blue (B) are arranged in a predetermined pattern (a Bayer array, a G stripe R/G full-checkered pattern, an X-Trans (registered trademark) array, or a honeycomb array) for each pixel and is a complementary metal oxide semiconductor (CMOS) image sensor. However, the imaging element 24 is not limited to the CMOS image sensor and may be a charge coupled device (CCD) image sensor.

The imaging element 24 is driven by a CMOS driver 28 including, for example, a vertical driver and a horizontal driver and a timing generator (TG) 29. A pixel signal corresponding to the amount of incident object light (a digital signal corresponding to signal charge accumulated in each pixel) is read from the imaging element 24.

The pan/tilt device 30 comprises, for example, a pan/tilt mechanism 32, the pan driving unit 34, and the tilt driving unit 36. As illustrated in FIG. 1, the pan/tilt mechanism 32 includes a pan mechanism that rotates the imaging unit 20 in the horizontal direction (pan direction) with respect to the device body 12 and a tilt mechanism that rotates the imaging unit 20 in the vertical direction (tilt direction) with respect to the device body 12. The pan/tilt mechanism 32 includes a home position sensor that detects the standard position of a rotation angle (pan angle) in the pan direction and a home position sensor that detects the standard position of an inclination angle (tilt angle) in the tilt direction.

The pan driving unit 34 and the tilt driving unit 36 each include a stepping motor and a motor driver and output driving force to the pan/tilt mechanism 32 to drive the pan/tilt mechanism 32.

The control unit 40 mainly comprises a signal processing unit 41, an imaging control unit 42, a lens control unit 43, a pan/tilt control unit 44, and a camera work control unit 46.

The signal processing unit 41 performs signal processing, such as an offset process, a gain control process including white balance correction and sensitivity correction, a gamma correction process, demosaic processing (demosaicing process), and an RGB/YC conversion process, for a digital image signal which is input from the imaging unit 20. Here, the demosaicing process is a process which calculates all color information of each pixel from a mosaic image corresponding to the color filter array of a single-plate-type color imaging element and is also referred to as a synchronization process. For example, in the case of an imaging element including color filters of three colors, that is, R, G, and B, the demosaicing process calculates the color information of all of R, G, and B of each pixel from an RGB mosaic image. In addition, the RGB/YC conversion process is a process which generates brightness data Y and color difference data items Cb and Cr from the demosaiced RGB image data.

The imaging control unit 42 issues, for example, an instruction to discharge the charge accumulated in a capacitor of each pixel of the imaging element 24 or an instruction to read a signal corresponding to the charge accumulated in the capacitor through the CMOS driver 28 and the TG 29 and performs imaging control.

The lens control unit 43 controls the focus lens, the variable magnification lens, and the diaphragm 23 included in the imaging lens 22 through the lens driving unit 26 and performs, for example, auto focus (AF) control for moving the focus lens to an in-focus position. The AF control is performed by integrating the absolute values of high-frequency components of a digital signal corresponding to an AF area, detecting an in-focus position where the integrated value (AF evaluation value) is the maximum, and moving the focus lens to the detected in-focus position.

The pan/tilt control unit 44 controls the pan/tilt device 30.

The camera work control unit 46 outputs a command signal to control the lens control unit 43 and the pan/tilt control unit 44.

The wireless communication unit 50 performs wireless communication with an external terminal, such as the smart phone 100 illustrated in FIG. 1, and receives various operation instructions input from the smart phone 100 using wireless communication. In addition, the wireless communication unit 50 transmits, for example, an image to be recorded to the smart phone 100. Furthermore, when the imaging unit 20 captures a moving image and the signal processing unit 41 processes the moving image, the wireless communication unit 50 can transmit the processed image (live view image) to the smart phone 100. In this way, the image to be recorded, such as a moving image, can be recorded in a recording medium which is provided in the smart phone 100 or an external recording medium, or a live view image can be displayed on a display unit (display input unit 120) of the smart phone 100.

The operating unit 60 includes, for example, an imaging start button 19 (FIG. 1) and a power button which are provided in the device body 12 and can be used to input an operation instruction similar to the operation instruction from the smart phone 100.

A camera-side display unit 61 functions as an image display unit which displays, for example, a live view image and a playback image and also functions as a user interface unit (UI unit) for displaying a menu screen and for setting and inputting various parameters, in cooperation with the operating unit 60.

A memory 62 includes, for example, a synchronous dynamic random access memory (SDRAM) serving as a storage area that temporarily stores still images or moving images or a work area that performs various types of arithmetic processing or a read only memory (ROM) that stores an imaging program and various kinds of data required for control.

First Embodiment

Figure 3:
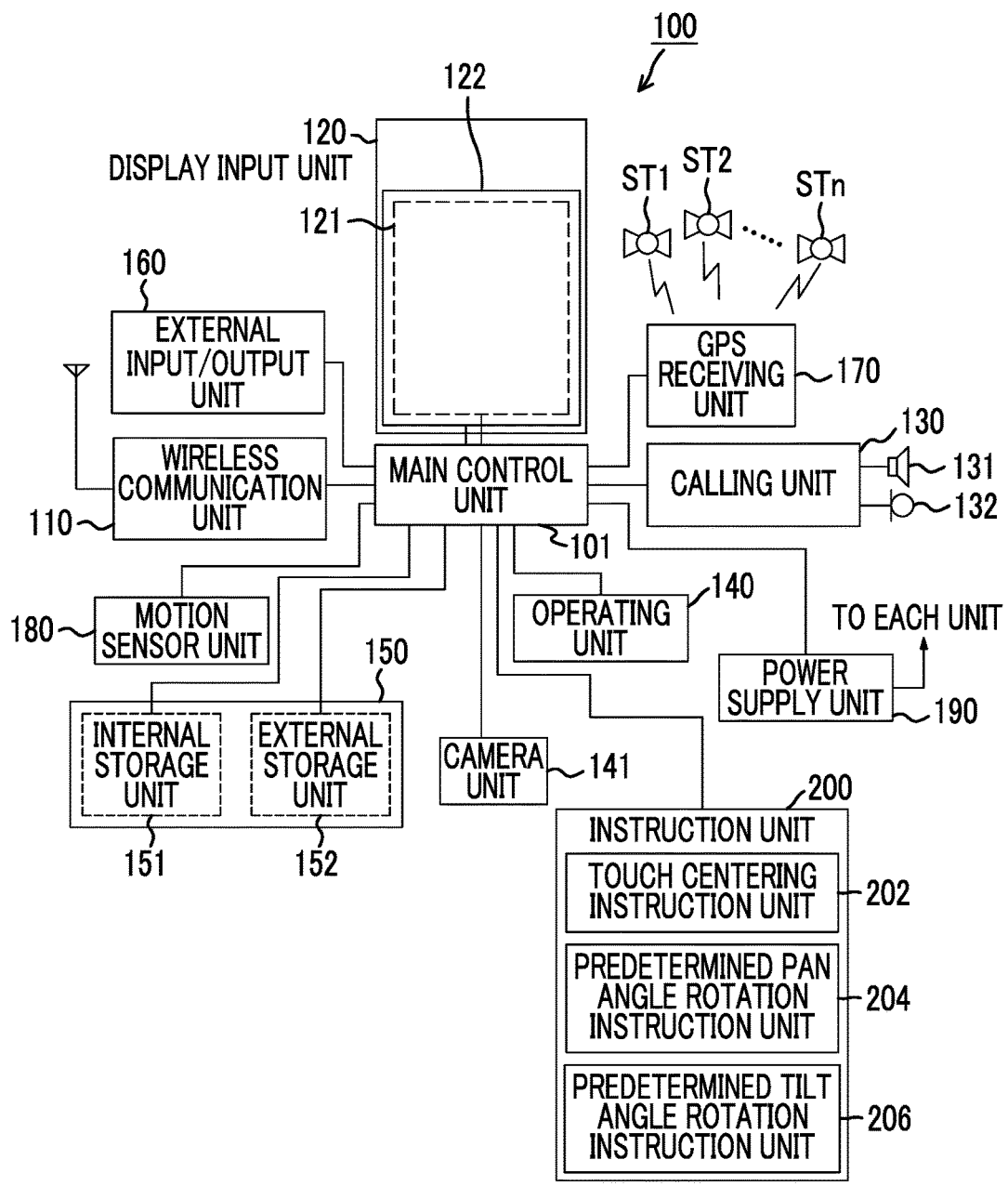
FIG. 3 is a block diagram illustrating an example of the internal structure of a smart phone.

FIG. 3 is a block diagram illustrating an example of the internal structure of the pan/tilt operation device (smart phone 100) illustrated in FIG. 1.

As illustrated in FIG. 3, the smart phone 100 comprises, as main components, a wireless communication unit 110, the display input unit 120, a calling unit 130, an operating unit 140, a camera unit 141, a storage unit 150, an external input/output unit 160, a global positioning system (GPS) receiving unit 170, a motion sensor unit 180, a power supply unit 190, a main control unit 101, and an instruction unit 200. In addition, the smart phone 100 has, as a main function, a wireless communication function which performs mobile wireless communication through a base station apparatus BS and a mobile communication network NW.

The wireless communication unit 110 performs wireless communication with the base station apparatus BS which is accommodated in the mobile communication network NW in response to an instruction from the main control unit 101. The wireless communication is used to transmit and receive various types of file data, such as voice data and image data, and electronic mail data or to receive, for example, web data or streaming data. In this example, the wireless communication unit 110 of the smart phone 100 transmits various operation instruction inputs to the imaging device 10 or receives, for example, a live view image and an image to be recorded from the imaging device 10.

The display input unit 120 displays, for example, images (still images and moving images) or text information to visually transmit information to the user and detects the user's operation for the displayed information under the control of a display control unit (not illustrated) of the main control unit 101. The display input unit 120 comprises a display panel (display unit) 121 and an operation panel (touch panel) 122. It is preferable that the display panel 121 is a 3D display panel in a case in which a 3D image is viewed. The display control unit provided in the main control unit 101 will be described below.

The display panel 121 uses, for example, a liquid crystal display (LCD) or an organic electro-luminescence display (OELD) as a display device.

The operation panel 122 is a device that is provided such that an image displayed on a display surface of the display panel 121 is visually recognized and detects one or a plurality of coordinate points operated by a finger of the user or a stylus. When the device is operated by a finger of the user or a stylus, a detection signal which is generated by the operation is output to the main control unit 101. Then, the main control unit 101 detects an operation position (coordinates) on the display panel 121 on the basis of the received detection signal.

As illustrated in FIG. 1, the display panel 121 and the operation panel 122 of the smart phone 100 are integrated to form the display input unit 120 and the operation panel 122 is provided so as to completely cover the display panel 121. In a case in which this structure is used, the operation panel 122 may have a function of detecting the user's operation even in a region other than the display panel 121. In other words, the operation panel 122 may comprise a detection region (hereinafter, referred to as a display region) for an overlap portion which overlaps the display panel 121 and a detection region (hereinafter, referred to as a non-display region) for an outer edge portion which does not overlap the display panel 121.

The size of the display region may be exactly equal to the size of the display panel 121. However, the sizes are not necessarily equal to each other. The operation panel 122 may comprise two sensitive regions, that is, an outer edge portion and an inner portion other than the outer edge portion. The width of the outer edge portion is appropriately designed according to, for example, the size of the housing 102. Examples of a position detecting method which is used in the operation panel 122 include a matrix switching method, a resistive film method, a surface elastic wave method, an infrared method, an electromagnetic induction method, and a capacitive sensing method. Any of the methods may be used.

The calling unit 130 comprises a speaker 131 and a microphone 132. The calling unit 130 converts the voice of the user which is input through the microphone 132 into voice data which can be processed by the main control unit 101 and outputs the converted voice data to the main control unit 101. In addition, the calling unit 130 decodes voice data received by the wireless communication unit 110 or the external input/output unit 160 and outputs the decoded voice data from the speaker 131. As illustrated in FIG. 1, for example, the speaker 131 and the microphone 132 can be mounted on the same surface as the display input unit 120.

The operating unit 140 is a hardware key which uses, for example, a key switch and receives instructions from the user. For example, the operating unit 140 is a push button switch which is mounted on a lower portion and a lower surface of the display input unit 120 of the housing 102 of the smart phone 100, is turned on when it is pressed by, for example, a finger, and is turned off by the restoring force of a spring when the finger is taken off.

The storage unit 150 stores a control program or control data of the main control unit 101, address data which is associated with, for example, the names or phone numbers of communication partners, and transmitted and received electronic mail data, web data which is downloaded by web browsing, or downloaded content data. In addition, the storage unit 150 temporarily stores, for example, streaming data. The storage unit 150 includes an internal storage unit 151 which is provided in the smart phone and an external storage unit 152 which has a slot for a detachable and attachable external memory. The internal storage unit 151 and the external storage unit 152 forming the storage unit 150 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 160 functions as an interface with all of the external apparatuses connected to the smart phone 100 and is directly or indirectly connected to other external apparatuses by communication (for example, universal serial bus (USB) communication or IEEE1394) or a network (for example, the Internet, a wireless local area network (LAN), a Bluetooth (registered trademark) network, a radio frequency identification (RFID) network, an infrared data association (IrDA (registered trademark)) network, an ultra wideband (UWB) (registered trademark) network, or a ZigBee (registered trademark) network).

Examples of the external apparatus connected to the smart phone 100 include a wired/wireless headset, a wired/wireless external charger, a wired/wireless data port, a memory card which is connected through a card socket, a subscriber identity module (SIM)/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a personal digital assistant (PDA) which is connected wirelessly or in a wired manner, and an earphone which is connected wirelessly or in a wired manner. The external input/output unit 160 can transmit data which is received from the external apparatus to each component of the smart phone 100 or can transmit data in the smart phone 100 to the external apparatus.

The GPS receiving unit 170 receives GPS signals transmitted from GPS satellites ST1 to STn and performs a position measurement process on the basis of a plurality of received GPS signals to detect a position including the latitude, longitude, and height of the smart phone 100, in response to an instruction from the main control unit 101. When the GPS receiving unit 170 can acquire positional information from the wireless communication unit 110 or the external input/output unit 160 (for example, a wireless LAN), it can detect the position using the positional information.

The motion sensor unit 180 comprises, for example, a triaxial acceleration sensor and detects the physical movement of the smart phone 100 in response to an instruction from the main control unit 101. When the physical movement of the smart phone 100 is detected, the moving direction or acceleration of the smart phone 100 is detected. The detection result is output to the main control unit 101.

The power supply unit 190 supplies power which is stored in a battery (not illustrated) to each unit of the smart phone 100 in response to an instruction from the main control unit 101.

The main control unit 101 comprises a microprocessor, operates on the basis of the control program or control data stored in the storage unit 150, and controls the overall operation of each unit of the smart phone 100. The main control unit 101 has an application processing function and a mobile communication control function of controlling each unit of a communication system in order to perform voice communication or data communication through the wireless communication unit 110.

The application processing function is implemented by the operation of the main control unit 101 based on the application software which is stored in the storage unit 150. Examples of the application processing function include an infrared communication function which controls the external input/output unit 160 such that data communication with an opposing apparatus is performed, an electronic mail function which transmits and receives electronic mail, and a web browsing function which browses web pages.

The display control unit of the main control unit 101 displays an image on the display input unit 120 on the basis of image data (still image or moving image data) such as received data or downloaded streaming data. The display control unit displays the live view image captured by the imaging unit 20 of the imaging device 10 on the display input unit 120.

The display control unit displays a software key, such as an icon for starting application software or a scroll bar, or displays a window for creating electronic mail. The scroll bar means a software key for receiving an instruction to move a displayed portion of an image that is too large to fit into the display region of the display panel 121.

The main control unit 101 performs operation detection control to detect the operation of the user through the operating unit 140 and the operation panel 122.

In addition, the main control unit 101 performs the operation detection control to detect the operation of the user through the operating unit 140, to receive an operation for the icon or the input of a character string to an input field of the window through the operation panel 122, or to receive a request to scroll the displayed image through the scroll bar.

The main control unit 101 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

For example, the main control unit 101 performs the operation detection control to detect the coordinates of a touch position in a touch centering detection region 214, a predetermined pan angle rotation instruction region 210, and a predetermined tilt angle rotation instruction region 212 on the touch panel. Then, the main control unit 101 transmits information related to the detected coordinates of the touch position to the instruction unit 200. When the touch panel is touched, the touch of the touch panel with a finger of a person or a pen may be recognized and various touch methods may be used. That is, in the invention, the touch is not particularly limited and includes various touch methods performed on the touch panel. For example, the touch includes all of the general touch operations such as swipe, slide, and drag operations with a finger or a pen on the touch panel.

The instruction unit 200 comprises a touch centering instruction unit 202, a predetermined pan angle rotation instruction unit 204, and a predetermined tilt angle rotation instruction unit 206 and outputs an instruction to operate the pan/tilt mechanism 32 on the basis of the information related the coordinates of the touch position which is transmitted from the main control unit 101.

When the information related the coordinates of the touch position in the touch centering detection region 214 (FIG. 4) is received, the touch centering instruction unit 202 outputs an instruction to pan and tilt the pan/tilt mechanism 32 such that a point on a live view image corresponding to the coordinates of the touch position on the operation panel 122 is located at the center of the live view image. Here, the touch centering (function) means that a point (coordinates) on a live view image is specified by a touch operation on the touch panel and the pan/tilt mechanism 32 is operated such that the specified point is displayed at the center 218 of the display input unit 120.

For example, in a case in which a position close to the center 218 of the display input unit 120 is touched, the touch centering instruction unit 202 outputs an instruction to operate the pan/tilt mechanism 32 at a relatively small rotation angle such that a specified point on the live view image is displayed at the center 218 of the display input unit 120. In contrast, in a case in which a position in the vicinity of an end portion of the display input unit 120 is touched, the touch centering instruction unit 202 outputs an instruction to operate the pan/tilt mechanism 32 at a relatively large rotation angle such that a specified point on the live view image is displayed at the center 218 of the display input unit 120.

When the information related to the coordinates of the touch position in the predetermined pan angle rotation instruction region 210 is received, the predetermined pan angle rotation instruction unit 204 outputs an instruction to pan the pan/tilt mechanism 32 at a predetermined pan angle. Here, the predetermined pan angle means a rotation angle in the set pan direction and various values are used as the predetermined pan angle. For example, the predetermined pan angle may be set to a value that is equal to or greater than the maximum pan angle which can be output from the touch centering instruction unit 202. When the predetermined pan angle is set to a value that is equal to or greater than the maximum pan angle which can be output from the touch centering instruction unit 202, the predetermined pan angle rotation instruction unit 204 can output an instruction related to a large pan angle that is not capable of being output from the touch centering instruction unit 202. Therefore, according to this aspect, a large change in the angle of view can be simply and rapidly made by one operation.

When the information related to the coordinates of the touch position in the predetermined tilt angle rotation instruction region 212 is received, the predetermined tilt angle rotation instruction unit 206 outputs an instruction to tile the pan/tilt mechanism 32 at a predetermined tilt angle. Here, the predetermined tilt angle means a rotation angle in the set tilt direction and various values are used as the predetermined tilt angle. For example, the predetermined tilt angle may be set to a value that is equal to or greater than the maximum tilt angle which can be output from the touch centering instruction unit 202. When the predetermined tilt angle is set to a value that is equal to or greater than the maximum tilt angle which can be output from the touch centering instruction unit 202, the predetermined tilt angle rotation instruction unit 206 can output an instruction related to a large tilt angle that is not capable of being output from the touch centering instruction unit 202. Therefore, according to this aspect, a large change in the angle of view can be simply and rapidly made by one operation.

As such, in the invention, when one touch operation is detected in a specific region, the pan/tilt mechanism 32 is operated at a predetermined pan angle or a predetermined tilt angle. Therefore, in the invention, it is possible to simply and rapidly operate the pan/tilt mechanism 32 to the position that is desired by the user.

The main control unit 101 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera which captures an electronic image using an imaging element such as a complementary metal oxide semiconductor (CMOS) or a charge-coupled device (CCD).

The camera unit 141 can convert captured image data into image data which is compressed in, for example, a Joint Photographic Coding Experts Group (JPEG) format and record the converted image data in the storage unit 150 or output the converted image data through the external input/output unit 160 or the wireless communication unit 110, under the control of the main control unit 101.

As illustrated in FIG. 1, the camera unit 141 is mounted on the same surface as the display input unit 120 in the smart phone 100. However, the mounting position of the camera unit 141 is not limited thereto. For example, the camera unit 141 may be mounted on the rear surface of the display input unit 120 or a plurality of camera units 141 may be mounted. In a case in which a plurality of camera units 141 are mounted, the camera units 141 which are used to capture images may be switched such that a single camera unit captures images or the plurality of camera units 141 may be simultaneously used to capture images.

The camera unit 141 can be used for various functions of the smart phone 100. For example, the image captured by the camera unit 141 can be displayed on the display panel 121 or the image captured by the camera unit 141 can be used as one of the operation inputs of the operation panel 122. When detecting the position, the GPS receiving unit 170 may detect the position with reference to the image from the camera unit 141. In addition, the optical axis direction of the camera unit 141 in the smart phone 100 may be determined or the current usage environment may be determined, with reference to the image from the camera unit 141, using the triaxial acceleration sensor or without using the triaxial acceleration sensor. Of course, the image from the camera unit 141 may be used in the application software.

In this example, application software for operating the imaging device 10 is downloaded through, for example, a network and is stored in the storage unit 150. The main control unit 101 is operated by the application processing function of the smart phone 100 according to the downloaded application software to make the general-purpose smart phone 100 function as a user interface unit (UI unit) for operating the imaging device 10.

(Display Mode)

Next, the display mode of the smart phone 100 will be described.

Figure 4:
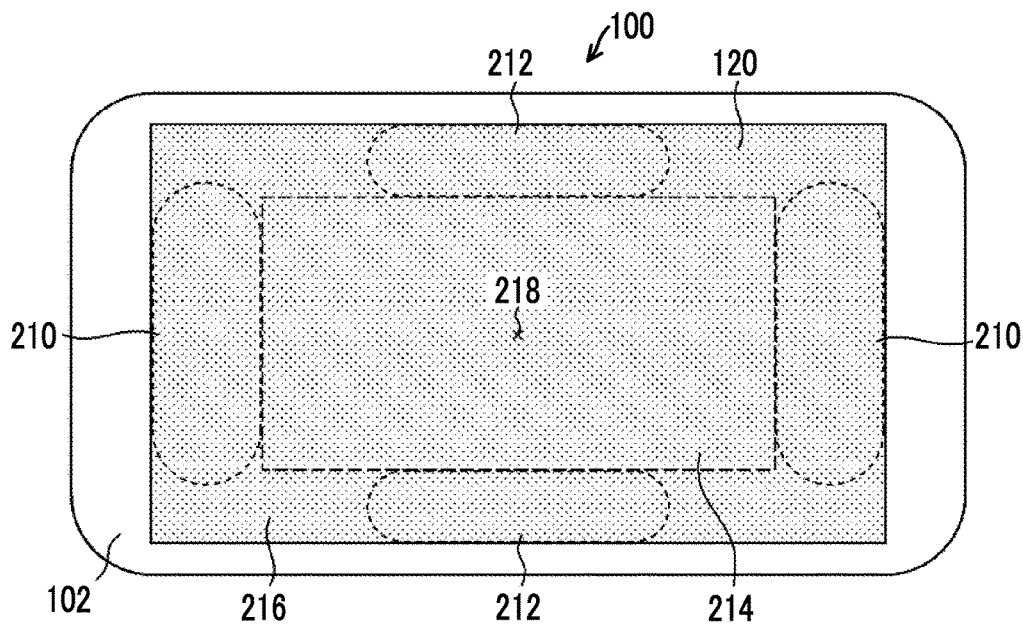
FIG. 4 is a front view illustrating the front surface of a display input unit of the smart phone.

FIG. 4 is a front view illustrating the front surface of the display input unit 120 of the smart phone 100. The speaker 131, the microphone 132, the operating unit 140, and the camera unit 141 described in FIG. 1 are not illustrated.

As illustrated in FIG. 4, the touch centering detection region 214, the predetermined pan angle rotation instruction region 210, and the predetermined tilt angle rotation instruction region 212 are set in a region 216 in which a live view image is displayed in the display input unit 120 of the smart phone 100.

The touch centering detection region 214 is provided in a central portion of the display input unit 120. When the coordinates of a touch position in the touch centering detection region 214 is detected, information related to the detected coordinates of the touch position is transmitted to the touch centering instruction unit 202. The size or set position of the touch centering detection region 214 is not particularly limited and the touch centering detection region 214 may have various sizes and may be set at various positions. In the example illustrated in FIG. 4, the touch centering detection region 214 is provided in the central portion of the display input unit 120 including the center 218, is larger than the predetermined pan angle rotation instruction region 210 and the predetermined tilt angle rotation instruction region 212, and has a rectangular shape, similarly to the display input unit 120.

The predetermined pan angle rotation instruction regions 210 are provided on the left and right sides of the touch centering detection region 214. When the coordinates of a touch position in the predetermined pan angle rotation instruction region 210 are detected, information related to the detected coordinates of the touch position is transmitted to the predetermined pan angle rotation instruction unit 204. The size or set position of the predetermined pan angle rotation instruction region 210 is not particularly limited and the predetermined pan angle rotation instruction region 210 may have various sizes and may be set at various positions. In the example illustrated in FIG. 4, the predetermined pan angle rotation instruction regions 210 are provided on the left and right sides of the touch centering detection region 214 in FIG. 4. It is preferable that the predetermined pan angle rotation instruction region 210 is so large that a region touched by a finger of a person does not protrude from the predetermined pan angle rotation instruction region 210. In addition, different pan directions are set in the left predetermined pan angle rotation instruction region 210 and the right predetermined pan angle rotation instruction region 210. That is, a counterclockwise pan direction may be set in the left predetermined pan angle rotation instruction region 210 in the top view of the imaging device 10 and a clockwise pan direction may be set in the right predetermined pan angle rotation instruction region 210 in the top view of the imaging device 10. In this way, the rotation direction of the pan operation of the pan/tilt mechanism 32 is controlled according to the region to be touched.

The predetermined tilt angle rotation instruction regions 212 are provided on the upper and lower sides of the touch centering detection region 214. When the coordinates of a touch position in the predetermined tilt angle rotation instruction region 212 are detected, information related to the detected coordinates of the touch position is transmitted to the predetermined tilt angle rotation instruction unit 206. The size or set position of the predetermined tilt angle rotation instruction region 212 is not particularly limited and the predetermined tilt angle rotation instruction region 212 may have various sizes and may be set at various positions. In the example illustrated in FIG. 4, the predetermined tilt angle rotation instruction regions 212 are provided on the upper and lower sides of the touch centering detection region 214 in FIG. 4. It is preferable that the predetermined tilt angle rotation instruction regions 212 is so large that a region touched by a finger of a person does not protrude from the predetermined tilt angle rotation instruction regions 212. In addition, different tilt directions are set in the upper predetermined tilt angle rotation instruction region 212 and the lower predetermined tilt angle rotation instruction region 212. That is, the upper predetermined tilt angle rotation instruction region 212 may be used for a tilt operation in the upward direction and the lower predetermined tilt angle rotation instruction region 212 may be used for a tilt operation in the downward direction. In this way, the rotation direction of the tilt operation of the pan/tilt mechanism 32 is controlled according to the region to be touched.

As illustrated in FIG. 4, the display control unit of the main control unit 101 may be displayed such that the touch centering detection region 214, the predetermined pan angle rotation instruction region 210, and the predetermined tilt angle rotation instruction region 212 can be distinguished from each other. That is, the touch centering detection region 214, the predetermined pan angle rotation instruction region 210, and the predetermined tilt angle rotation instruction region 212 are represented by a dotted line, a one-dot chain line, and a solid such that the user can check the position of each region.

Next, a modification example of the display mode of the smart phone 100 will be described.

Figure 5:
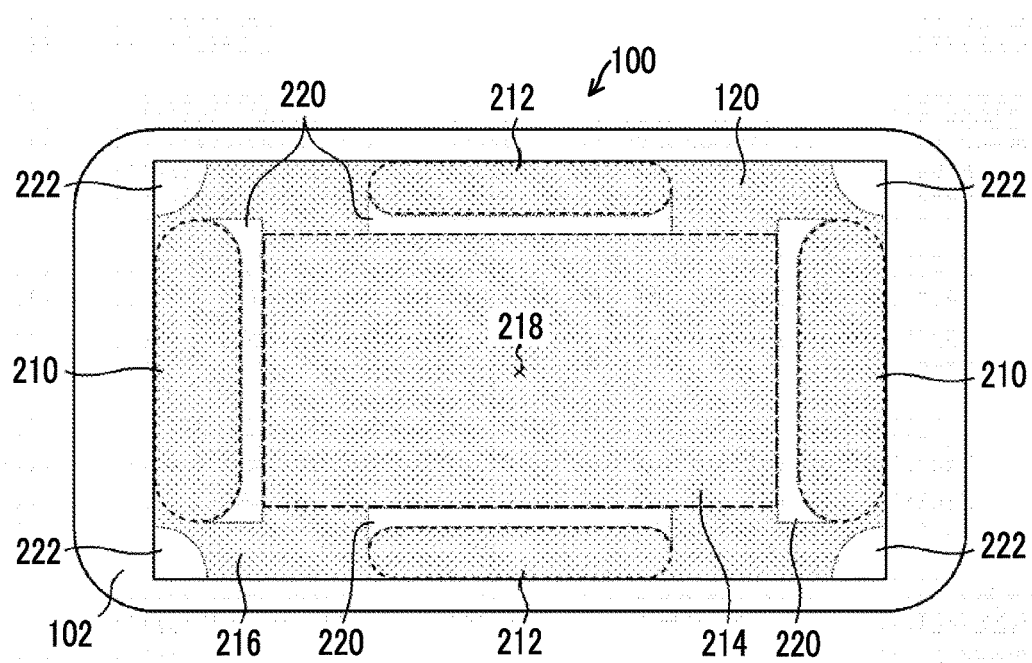
FIG. 5 is a front view illustrating the front surface of the display input unit of the smart phone.

FIG. 5 is a front view illustrating the front surface of the display input unit 120 of the smart phone 100, similarly to FIG. 4.

In a modification example of the display mode illustrated in FIG. 5, dead regions 220 are provided in which, when a position is touched, the coordinates of the touch position is not detected or the detected coordinates are not output. That is, the dead regions 220 (first dead regions) are set between the touch centering detection region 214 and the predetermined pan angle rotation instruction region 210 and between the touch centering detection region 214 and the predetermined tilt angle rotation instruction region 212. Therefore, it is possible to prevent an erroneous operation between the touch centering detection region 214 and the predetermined pan angle rotation instruction region 210 and to prevent an erroneous operation between the touch centering detection region 214 and the predetermined tilt angle rotation instruction region 212.

In addition, dead regions 222 (second dead regions) are set at the corners of the display input unit 120. Therefore, it is possible to prevent an erroneous operation due to the detection of a touch that is not intended by the user at the corners of the display input unit 120.

Figure 6A:
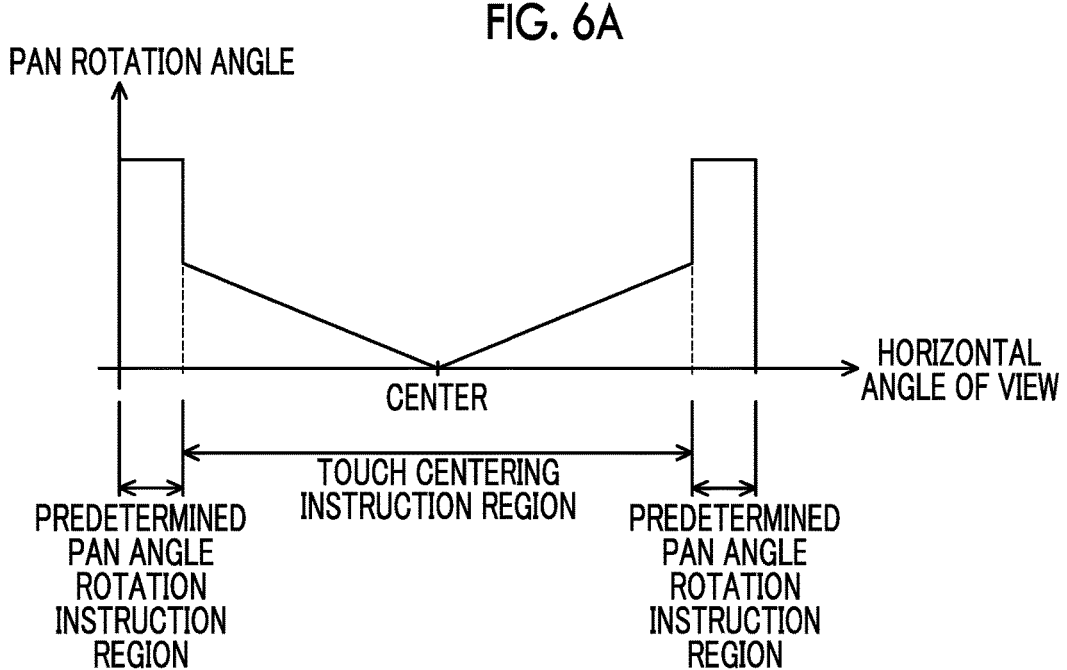
FIG. 6A is a graph illustrating the relationship between a distance from the center of the display input unit and a pan rotation angle.
Figure 6B:
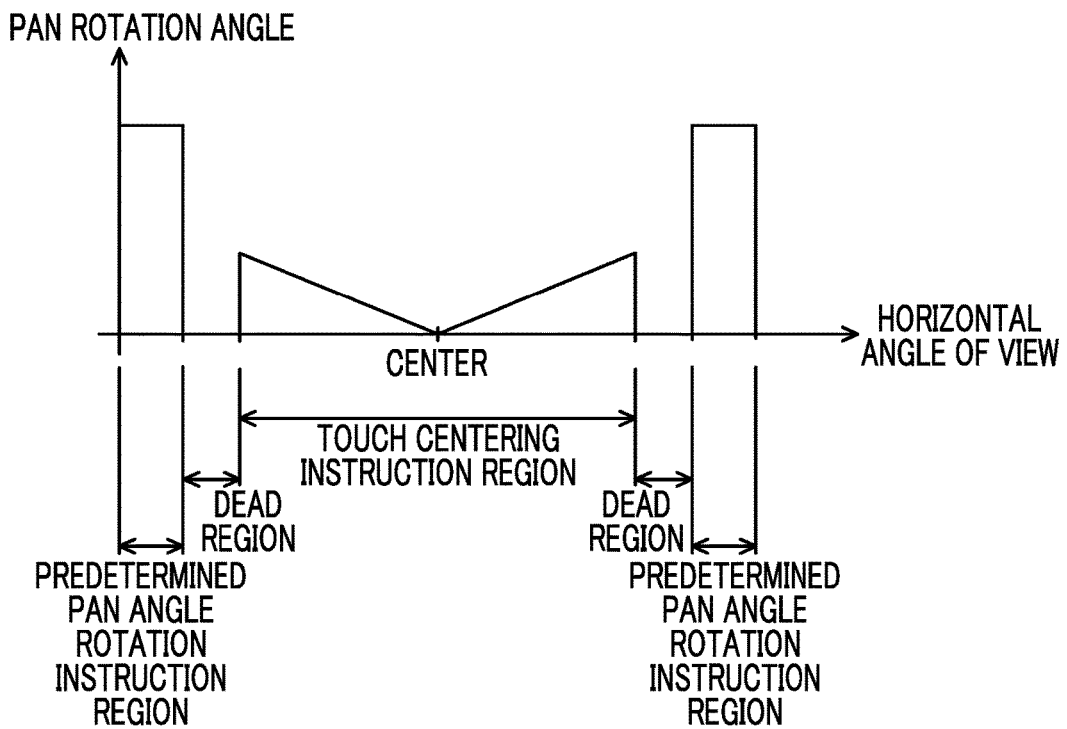
FIG. 6B is a graph illustrating the relationship between the distance from the center of the display input unit and the pan rotation angle.

FIGS. 6A and 6B are graphs illustrating the relationship between the distance (the horizontal angle of view) from the center 218 of the display input unit 120 and a pan rotation angle. FIG. 6A is a graph illustrating the relationship between the distance (the horizontal angle of view) from the center 218 of the display input unit 120 and the rotation angle of the pan operation of the pan/tilt mechanism 32 in the mode described in FIG. 4. As illustrated in FIG. 6A, in the touch centering instruction region, the pan rotation angle increases as the distance from the center 218 of the display input unit 120 increases. In contrast, in the predetermined pan angle rotation instruction region 210, the pan/tilt mechanism 32 is panned at a predetermined pan angle.

FIG. 6B is a graph illustrating the relationship between the distance (the horizontal angle of view) from the center 218 of the display input unit 120 and the rotation angle of the pan operation of the pan/tilt mechanism 32 in the mode described in FIG. 5. In the mode illustrated in FIG. 5, the dead regions 220 are set between the touch centering detection region 214 and the predetermined pan angle rotation instruction region 210 and between the touch centering detection region 214 and the predetermined tilt angle rotation instruction region 212. Therefore, as illustrated in FIG. 6B, a region in which the magnitude of the pan rotation angle is 0 is provided between the touch centering detection region 214 and the predetermined pan angle rotation instruction region 210 and between the touch centering detection region 214 and the predetermined tilt angle rotation instruction region 212.

Next, a case in which the pan/tilt mechanism 32 is operated in a direction opposite to an instructed direction to execute a received instruction will be described.

Figure 7A:
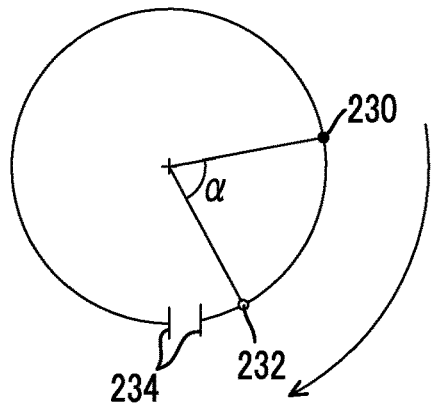
FIG. 7A is a diagram illustrating the rotation of a pan/tilt mechanism in a case in which the pan/tilt mechanism has mechanical end portions.
Figure 7B:
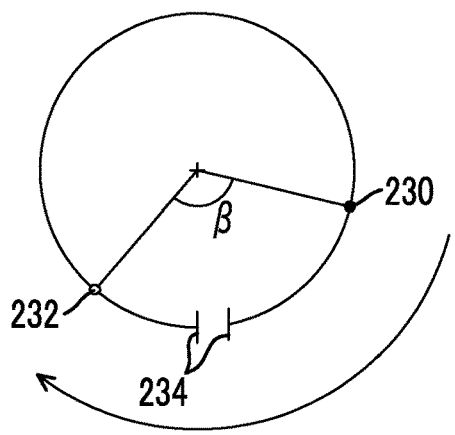
FIG. 7B is a diagram illustrating the rotation of the pan/tilt mechanism in a case in which the pan/tilt mechanism has the mechanical end portions.
Figure 7C:
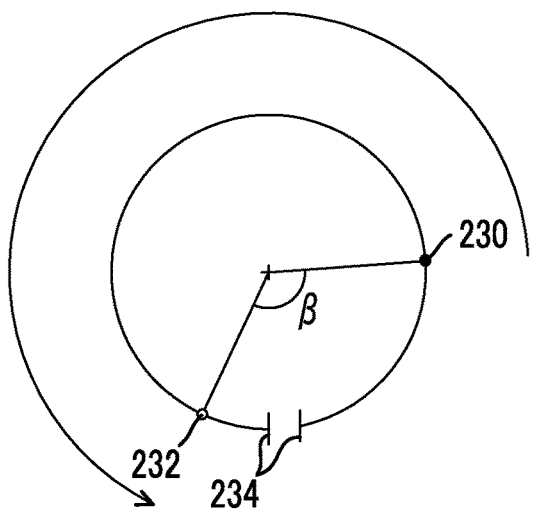
FIG. 7C is a diagram illustrating the rotation of the pan/tilt mechanism in a case in which the pan/tilt mechanism has the mechanical end portions.

FIGS. 7A to 7C are diagrams illustrating the rotation of the pan/tilt mechanism in a case in which the pan/tilt mechanism 32 has mechanical end portions 234. The range of the pan operation of the pan/tilt mechanism 32 is not particularly limited. In some cases, the pan/tilt mechanism 32 has the mechanical end portions 234 for, for example, wiring in a pan/tilt camera. That is, the base 14 of the imaging device 10 can be rotated in any range (less than) 360° and the limit of the rotation is the mechanical end portion 234 of the pan/tilt mechanism 32. FIGS. 7A to 7C illustrate the mechanical end portions 234 in the pan direction, a starting point 230 of the pan operation of the pan/tilt mechanism 32, and an end point 232 of the pan operation of the pan/tilt mechanism 32. A case in which a predetermined pan angle is α (FIG. 7A) and a case in which the predetermined pan angle is β (FIGS. 7B and 7C) will be described.

FIG. 7A illustrates a case in which the pan operation of the pan/tilt mechanism 32 is performed so as not to pass through the mechanical end portions 234. In a case in which the pan/tilt mechanism 32 is panned from the starting point 230 to the end point 232 as illustrated in FIG. 7A (the predetermined pan angle is α), for example, the right predetermined pan angle rotation instruction region 210 is touched and rotation is performed in the clockwise pan direction in the top view of the pan/tilt camera to pan the pan/tilt mechanism 32 at the predetermined pan angle (α).

FIG. 7B illustrates a case in which the pan operation of the pan/tilt mechanism 32 is performed across the mechanical end portions 234. In a case in which the pan/tilt mechanism 32 is panned from the starting point 230 to the end point 232 as illustrated in FIG. 7B (a predetermined pan angle is β), for example, even if the right predetermined pan angle rotation instruction region 210 is touched, it is difficult to pan the pan/tilt mechanism 32 at the predetermined pan angle (β) due to the mechanical end portions 234.

FIG. 7C illustrates a case in which the pan operation is performed at a predetermined pan angle (β), similarly to FIG. 7B. In this case, the pan/tilt mechanism 32 is panned in a direction opposite to the direction instructed by the operation of the touch panel to execute a received instruction. That is, for example, even if the right predetermined pan angle rotation instruction region 210 is touched to output an instruction to perform rotation in the clockwise pan direction in the top view of the pan/tilt camera, the pan/tilt mechanism 32 is operated in the counterclockwise pan direction (operated in the arrow direction illustrated in FIG. 7C) and the pan operation of the pan/tilt mechanism 32 at the predetermined pan angle (β) is achieved. As such, in this embodiment, since the pan operation is performed in a direction opposite to the instructed direction, the pan/tilt mechanism 32 is panned at a predetermined pan angle in a wide range. As described above, in a case in which it is determined that the pan/tilt mechanism 32 is panned in a direction opposite to the direction instructed by the operation of the touch panel to execute a received instruction, the predetermined pan angle rotation instruction unit 204 can output an instruction to pan the pan/tilt mechanism 32 in a direction opposite to the direction corresponding to a received instruction. In a case in which the imaging unit 20 captures a moving image, it is preferable that the pan operation described in FIGS. 7A to 7C is not performed in order to capture a natural moving image.

In a case in which the pan/tilt mechanism 32 is operated in a direction opposite to the direction corresponding to a received instruction, the predetermined pan angle rotation instruction region 210 may receive instructions in different instruction reception manners. For example, in a case in which an instruction is received by one touch operation, the pan/tilt mechanism 32 is rotated in response to the received instruction. In a case in which an instruction is received by two successive touch operations, the pan/tilt mechanism 32 is rotated in a direction opposite to the direction corresponding to the received instruction. Therefore, it is possible to select one of an operation which pans the pan/tilt mechanism 32 in the instructed direction to execute the instruction and an operation which pans the pan/tilt mechanism 32 in a direction opposite to the instructed direction to execute the instruction.

Figure 8:
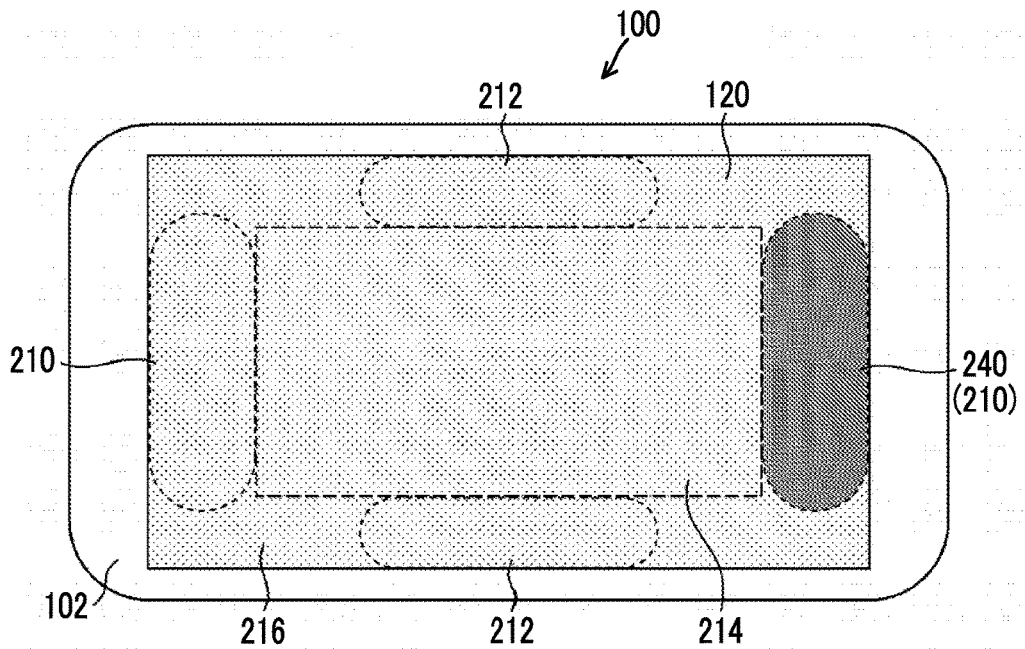
FIG. 8 is a front view illustrating the front surface of the display input unit of the smart phone.

FIG. 8 is a front view illustrating the front surface of the display input unit 120 of the smart phone 100. FIG. 8 illustrates an example of warning display 240 which is performed on the display input unit 120 in a case in which it is difficult to pan the pan/tilt mechanism 32 at a predetermined pan angle due to the mechanical end portions 234 as described in FIG. 7B.

In a case in which the pan/tilt mechanism 32 is panned in response to the instruction output from the predetermined pan angle rotation instruction unit and reaches the mechanical end portion 234 in rotation in the pan direction, the display control unit of the main control unit 101 may display, on the display unit, the warning display 240 indicating that the pan/tilt mechanism 32 rotated in the pan direction reaches the mechanical end portion 234. According to this aspect, since the warning display 240 indicating that the pan/tilt mechanism 32 is panned at a predetermined pan angle and reaches the mechanical end portion 234 is performed, the user can know the mechanical end portion 234 of the pan/tilt mechanism 32 in advance. FIG. 8 illustrates the warning display 240 in which the display mode of the right predetermined pan angle rotation instruction region 210 is changed.

Figure 9:
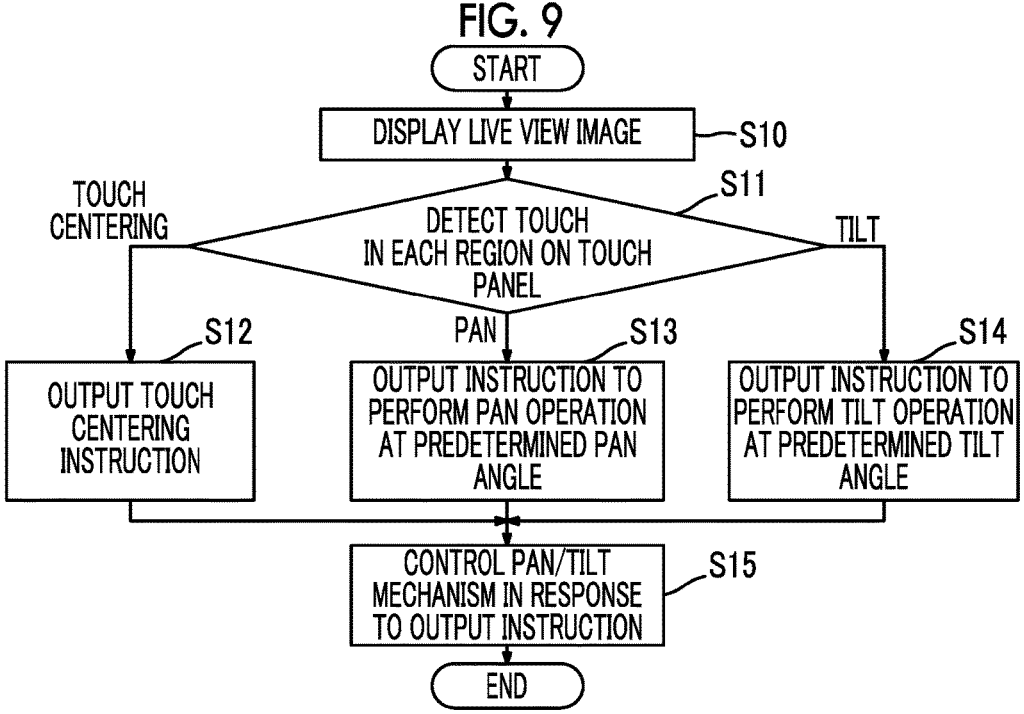
FIG. 9 is a flowchart illustrating the operation of the pan/tilt operation device.

FIG. 9 is a flowchart illustrating the operation of the pan/tilt operation device (smart phone 100) according to this embodiment.

First, the display control unit of the main control unit 101 displays a live view image on the display input unit 120 (Step S10). Then, the main control unit 101 detects a touch in the touch centering detection region 214, the predetermined pan angle rotation instruction region 210, or the predetermined tilt angle rotation instruction region 212 (Step S11). Then, an instruction to operate the pan/tilt mechanism 32 is output according to the region in which a touch is detected. That is, in a case in which a touch is detected in the touch centering detection region 214, the touch centering instruction unit 202 outputs an instruction to operate the pan/tilt mechanism 32 (Step S12). In a case in which a touch is detected in the predetermined pan angle rotation instruction region 210, the predetermined pan angle rotation instruction unit 204 outputs an instruction to operate the pan/tilt mechanism 32 (Step S13). In a case in which a touch is detected in the predetermined tilt angle rotation instruction region 212, the predetermined tilt angle rotation instruction unit 206 outputs an instruction to operate the pan/tilt mechanism 32 (Step S14). Then, the pan/tilt mechanism 32 is controlled according to the output instruction (Step S15).

The invention can be implemented by a program that causes a computer to perform each step of the above-mentioned flowchart. In this case, the program can be stored in a computer-readable (non-transitory) storage medium.

As described above, according to the embodiment of the invention, the pan/tilt mechanism 32 is panned at a predetermined pan angle which is set in advance by a manual operation or the pan/tilt mechanism 32 is tilted at a predetermined pan angle which is set in advance by a manual operation. Therefore, according to this aspect, the pan/tilt mechanism 32 can be operated at a predetermined pan angle and a predetermined tilt angle which are set in advance by one instruction in the pan/tilt camera. For example, it is possible to simply and rapidly perform the operation of a pan/tilt mechanism with a large rotation angle.

Second Embodiment

Next, a second embodiment of the invention will be described. In this embodiment, a predetermined pan angle and a predetermined tilt angle are changed depending on the zoom value of an optical zoom or an electronic zoom.

Figure 10:
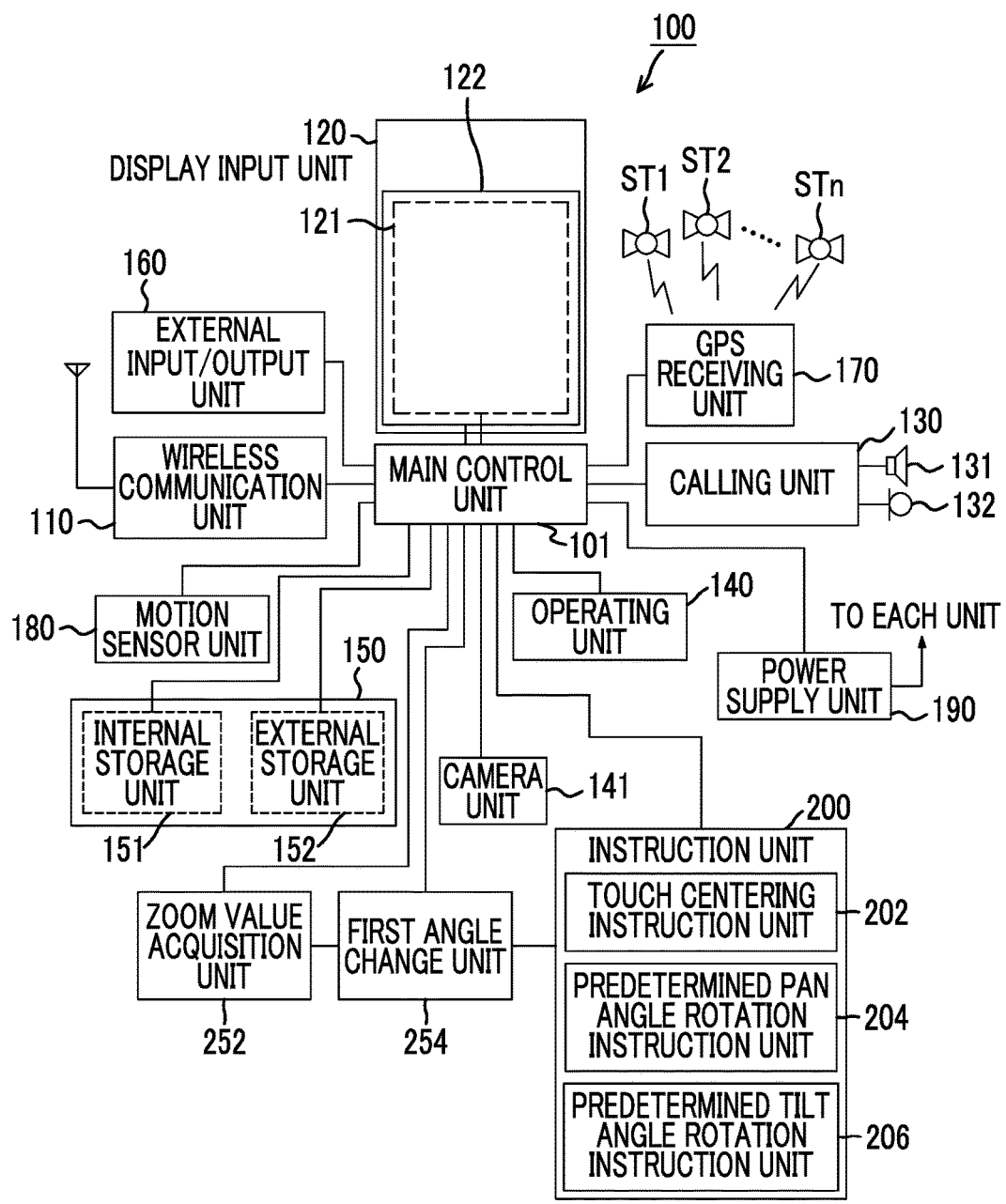
FIG. 10 is a block diagram illustrating an example of the internal structure of a smart phone according to a second embodiment.

FIG. 10 is a block diagram illustrating an example of the internal structure of a pan/tilt operation device (smart phone 100) according to the second embodiment. The same functional blocks as those described in FIG. 3 are denoted by the same reference numerals and the description thereof will not be repeated.

The block diagram illustrated in FIG. 10 differs from the block diagram illustrated in FIG. 3 in that a zoom value acquisition unit 252 and a first angle change unit 254 are added.

The zoom value acquisition unit 252 acquires the zoom value of the optical zoom of the imaging unit 20 in the imaging device 10 or the zoom value of the electronic zoom of a live view image. Specifically, the zoom value of the optical zoom is transmitted from the lens control unit 43 to the main control unit 101 of the smart phone 100 through the wireless communication unit 50 and the zoom value of the electronic zoom of the live view image is transmitted from the signal processing unit 41 to the main control unit 101 through the wireless communication unit 50. Then, the zoom value acquisition unit 252 acquires the zoom value of the optical zoom or the zoom value of the electronic zoom from the main control unit 101. Then, the zoom value acquisition unit 252 transmits the acquired zoom value of the optical zoom or the acquired zoom value of the electronic zoom to the first angle change unit 254.

The first angle change unit 254 changes a predetermined pan angle and a predetermined tilt angle according to the zoom value acquired by the zoom value acquisition unit. Specifically, the first angle change unit 254 changes a predetermined pan angle and a predetermined tilt angle which are the content of the instructions output from the predetermined pan angle rotation instruction unit 204 and the predetermined tilt angle rotation instruction unit 206. The first angle change unit 254 can change the predetermined pan angle and the predetermined tilt angle according to the zoom value in various aspects. For example, in a case in which the zoom value is large, the first angle change unit 254 changes the predetermined pan angle and the predetermined tilt angle so as to be reduced. In a case in which the zoom value is small, the first angle change unit 254 changes the predetermined pan angle and the predetermined tilt angle so as to be increased.

As described above, according to this embodiment, a predetermined pan angle and a predetermined tilt angle are changed according to the zoom value of the optical zoom or the electronic zoom. Therefore, even if the angle of view is changed by the optical zoom or the electronic zoom, the pan/tilt mechanism 32 can be panned or tilted according to the changed angle of view.

Third Embodiment

Next, a third embodiment of the invention will be described. In this embodiment, a predetermined pan angle and a predetermined tilt angle are changed according to the history of the instructions received through the predetermined pan angle rotation instruction region 210 and the predetermined tilt angle rotation instruction region 212.

Figure 11:
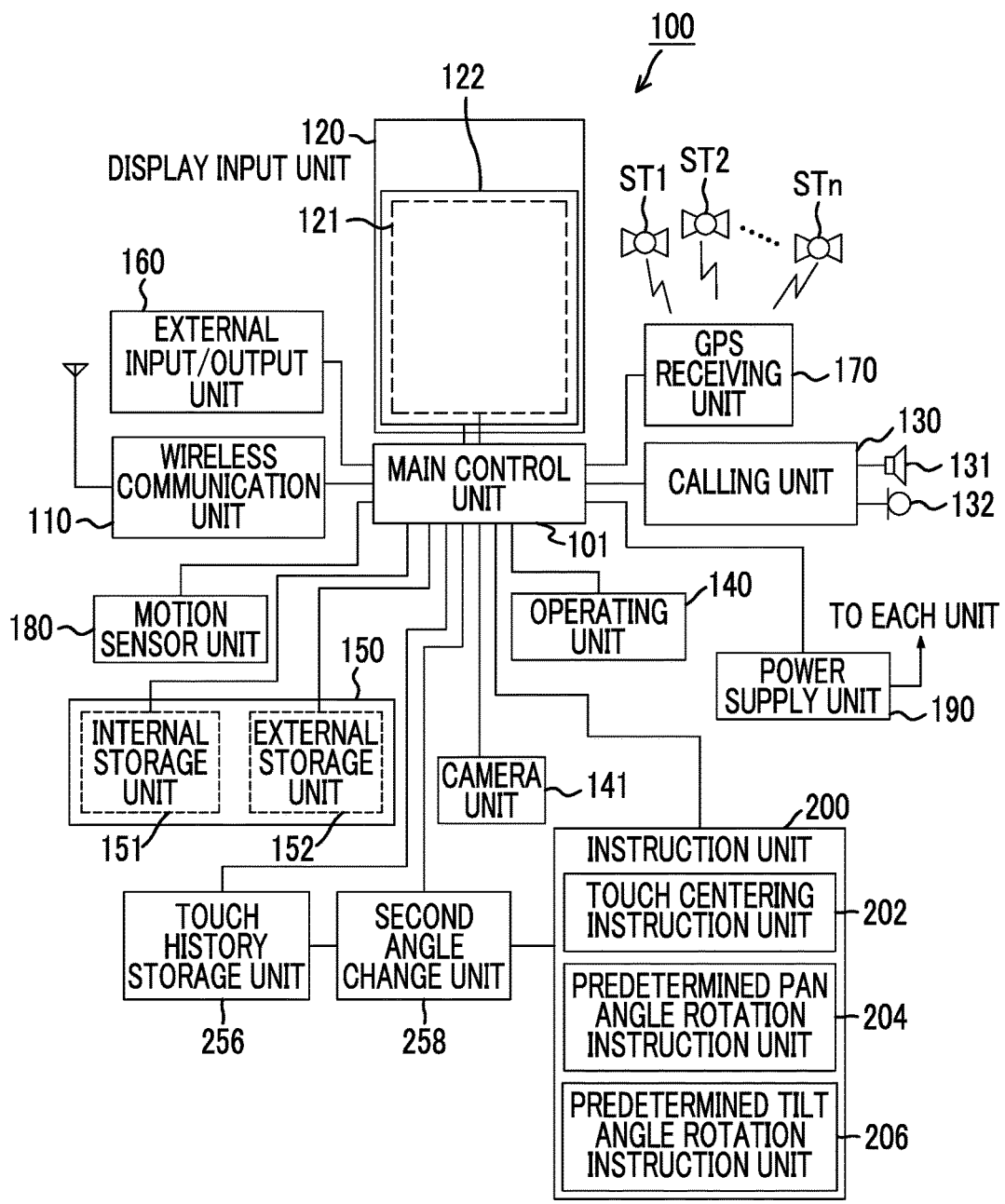
FIG. 11 is a block diagram illustrating an example of the internal structure of a smart phone according to a third embodiment.

FIG. 11 is a block diagram illustrating an example of the internal structure of a pan/tilt operation device (smart phone 100) according to the third embodiment. The same functional blocks as those described in FIG. 3 are denoted by the same reference numerals and the description thereof will not be repeated.

The block diagram illustrated in FIG. 11 differs from the block diagram illustrated in FIG. 3 in that a touch history storage unit 256 and a second angle change unit 258 are added.

The touch history storage unit 256 stores the history of touches detected in the predetermined pan angle rotation instruction region 210 and the predetermined tilt angle rotation instruction region 212 through the main control unit 101. The touch history storage unit 256 can store the history of the detected touches in various ways. For example, the touch history storage unit 256 can store the number of times a touch is detected in the predetermined pan angle rotation instruction region 210 or the predetermined tilt angle rotation instruction region 212. In addition, the touch history storage unit 256 can store the time interval between the touches which are continuously detected.

The second angle change unit 258 changes a predetermined pan angle and a predetermined tilt angle according to the history stored in the touch history storage unit 256. Specifically, the second angle change unit 258 changes the predetermined pan angle and the predetermined tilt angle according to the number of touches and the time interval between the continuously detected touches which are stored in the touch history storage unit 256. Then, the predetermined pan angle rotation instruction unit 204 outputs an instruction to pan the pan/tilt mechanism 32 at the predetermined pan angle changed by the second angle change unit 258 and the predetermined tilt angle rotation instruction unit 206 outputs an instruction to tilt the pan/tilt mechanism 32 at the predetermined tilt angle changed by the second angle change unit 258.

Figure 12A:
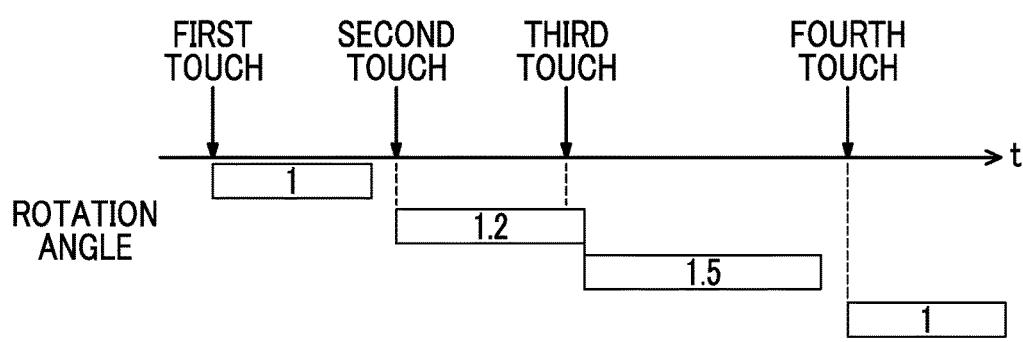
FIG. 12A is a conceptual diagram illustrating an example in which a predetermined pan angle and a predetermined tilt angle are changed.
Figure 12B:
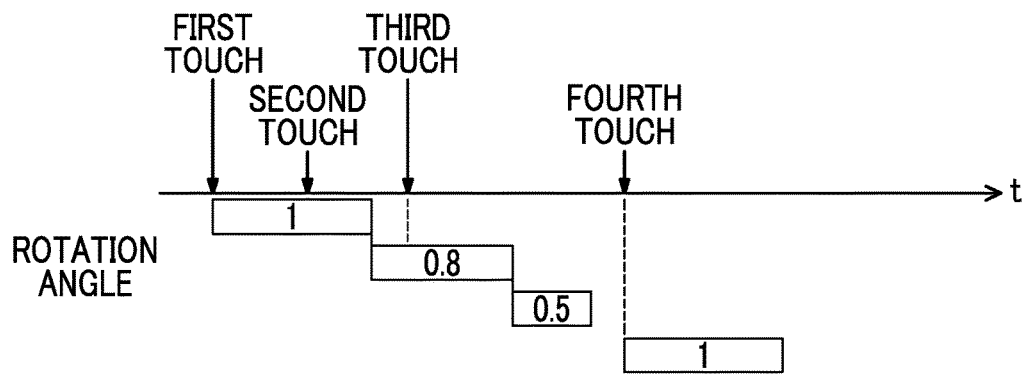
FIG. 12B is a conceptual diagram illustrating an example in which the predetermined pan angle and the predetermined tilt angle are changed.

FIGS. 12A and 12B are conceptual diagrams illustrating examples of a case in which the second angle change unit 258 changes the predetermined pan angle and the predetermined tilt angle according to the history stored in the touch history storage unit 256.

FIG. 12A is a diagram illustrating the change of the predetermined pan angle by the second angle change unit 258 in a case in which the first to third touches are performed at short time intervals and the time interval between the third touch and the fourth touch is long. Since the time interval between the first touch, the second touch, and the third touch is short, the predetermined pan angle operated by the second touch is 1.2 times the horizontal angle of view and the predetermined pan angle operated by the third touch is 1.5 times the horizontal angle of view. In addition, since touches are continuously performed at short intervals, the operation by the second touch and the operation by the third touch are continuous. In contrast, since the time interval from the third touch to the fourth touch is long, the predetermined pan angle operated by the fourth touch is one time the general angle of view. Here, the short time interval means a time interval that is equal to or greater than 0.5 seconds and equal to or less than 1 second and the long time interval means a time interval that is equal to or greater than 1 second.

FIG. 12B is a diagram illustrating the change of the rotation angle by the second angle change unit 258 in a case in which the time interval from the first touch to the third touch is very short and the time interval between the third touch and the fourth touch is long. Since the time interval between the first touch, the second touch, and the third touch is very short, the predetermined pan angle operated by the second touch is 0.8 times the horizontal angle of view and the predetermined pan angle operated by the third touch is 0.5 times the horizontal angle of view. In contrast, since the time interval from the third touch to the fourth touch is long, the predetermined pan angle operated by the fourth touch is one time the general angle of view. In addition, since the time interval between the first touch, the second touch, and the third touch is very short, the operations by the first to third touches are continuous. Here, the very short time interval means a time interval that is greater than 0 seconds and less than 0.5 seconds.

As described above, according to this embodiment, since the predetermined pan angle and the predetermined tilt angle are changed according to the history of the touches received through the predetermined pan angle rotation instruction region 210 and the predetermined tilt angle rotation instruction region 212, it is possible to operate the pan/tilt mechanism 32 according to the touch history.

Fourth Embodiment

Next, a fourth embodiment of the invention will be described. In this embodiment, the pan/tilt mechanism 32 can be operated at an intermediate pan angle that is greater than the maximum pan angle achieved by a touch centering function and is less than a predetermined pan angle or at an intermediate tilt angle that is greater than the maximum tilt angle achieved by the touch centering function and is less than a predetermined tilt angle.

FIG. 13 is a block diagram illustrating an example of the internal structure of a pan/tilt operation device (smart phone 100) according to the fourth embodiment. The same functional blocks as those described in FIG. 3 are denoted by the same reference numerals and the description thereof will not be repeated.

The functional block illustrated in FIG. 13 differs from the functional block illustrated in FIG. 3 in that a pan intermediate instruction unit 260 and a tilt intermediate instruction unit 262 are added to the instruction unit 200.

When the coordinates of a touch position in a pan intermediate instruction region 272 (FIG. 14) are detected, the pan intermediate instruction unit 260 outputs an instruction to pan the pan/tilt mechanism 32 at an intermediate pan angle that is greater than the maximum pan angle instructed by the touch centering instruction unit 202 and is less than a predetermined pan angle. Here, the intermediate pan angle is not particularly limited as long as it is greater than the maximum pan angle instructed by the touch centering instruction unit 202 and is less than the predetermined pan angle. For example, the intermediate pan angle may be an intermediate value between the maximum pan angle instructed by the touch centering instruction unit 202 and the predetermined pan angle. In addition, the intermediate pan angle may change depending on the distance from the center 218 of the display input unit 120, which will be described with reference to 15.

When the coordinates of a touch position in a tilt intermediate instruction region 270 (FIG. 14), the tilt intermediate instruction unit 262 outputs an instruction to tilt the pan/tilt mechanism 32 at an intermediate tilt angle that is greater than the maximum tilt angle instructed by the touch centering instruction unit 202 and is less than a predetermined tilt angle. The intermediate tilt angle is defined similarly to the intermediate pan angle. The intermediate tilt angle may be an intermediate value between the maximum tilt angle instructed by the touch centering instruction unit 202 and the predetermined tilt angle. In addition, the intermediate tilt angle may change depending on the distance from the center 218 of the display input unit 120, which will be described with reference to FIG. 15.

Figure 14:
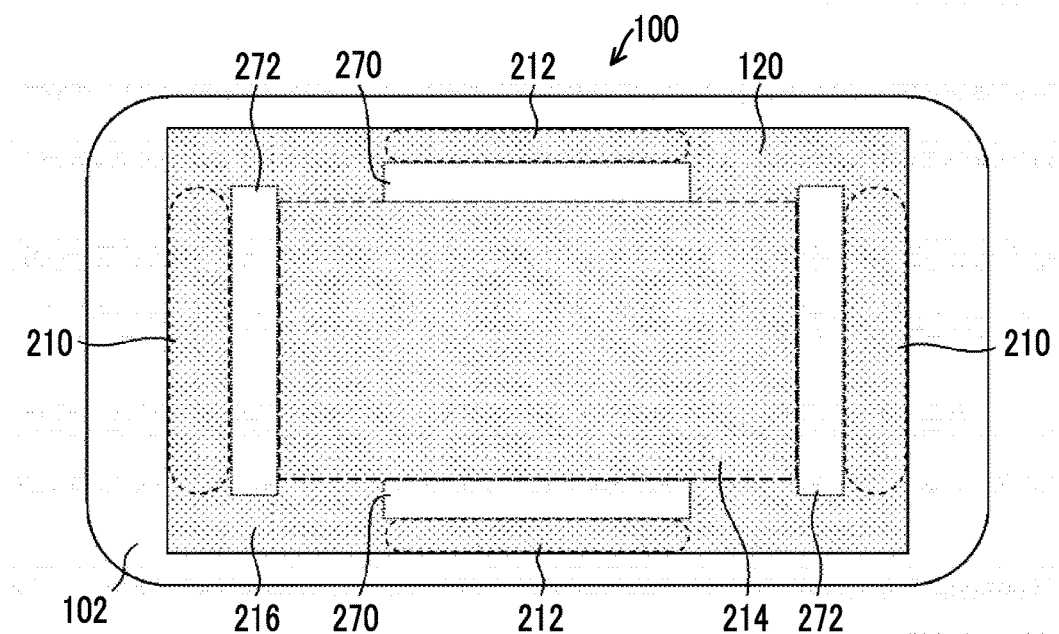
FIG. 14 is a front view illustrating the front surface of a display input unit of the smart phone.

FIG. 14 is a front view illustrating the front surface of the display input unit 120 of the smart phone 100. FIG. 14 illustrates each region which is displayed on the display input unit 120 of the smart phone 100 according to the fourth embodiment. The same components as those described in FIG. 4 are denoted by the same reference numerals and the description thereof will not be repeated.

In the display input unit 120 of the smart phone 100 according to the fourth embodiment, the pan intermediate instruction region 272 is set between the touch centering detection region 214 and the predetermined pan angle rotation instruction region 210 and the tilt intermediate instruction region 270 is set between the touch centering detection region 214 and the predetermined tilt angle rotation instruction region 212.

When the coordinates of a touch position in the pan intermediate instruction region 272 are detected, information related to the detected coordinates is transmitted to the pan intermediate instruction unit 260. The size or set position of the pan intermediate instruction region 272 is not particularly limited and the pan intermediate instruction region 272 may have various sizes and may be set at various positions. In the example illustrated in FIG. 14, the pan intermediate instruction regions 272 are set on the left and right sides of the touch centering detection region 214 in FIG. 14 and are interposed between the touch centering detection region 214 and the predetermined pan angle rotation instruction regions 210. Different pan directions are set in the left pan intermediate instruction region 272 and the right pan intermediate instruction region 272, similarly to the predetermined pan angle rotation instruction regions 210 described in FIG. 4.

When the coordinates of a touch position in the tilt intermediate instruction region 270 are detected, information related to the detected coordinates is transmitted to the tilt intermediate instruction unit 262. The size or set position of the tilt intermediate instruction region 270 is not particularly limited and the tilt intermediate instruction region 270 may have various sizes and may be set at various positions. In the example illustrated in FIG. 14, the tilt intermediate instruction regions 270 are set on the upper and lower sides of the touch centering detection region 214 in FIG. 14 and are interposed between the touch centering detection region 214 and the predetermined tilt angle rotation instruction regions 212. Different tilt directions are set in the upper tilt intermediate instruction region 270 and the lower tilt intermediate instruction region 270, similarly to the predetermined tilt angle rotation instruction regions 212 described in FIG. 4.

Figure 15:
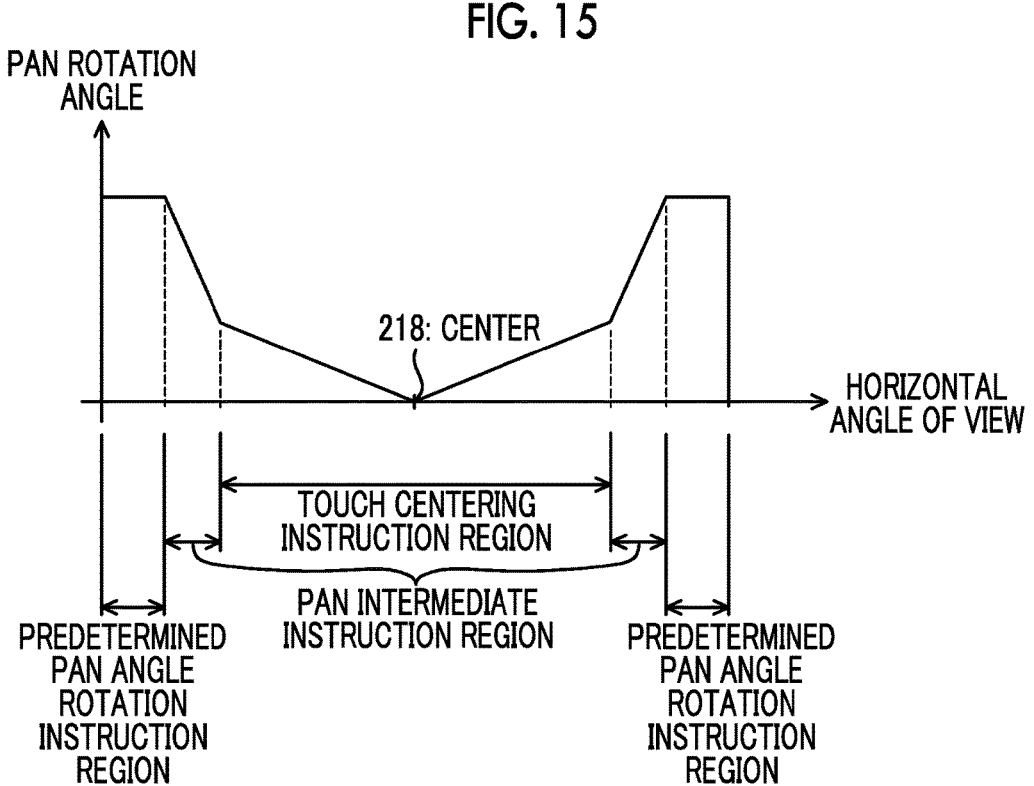
FIG. 15 is a graph illustrating the relationship between a distance from the center of the display input unit and a pan rotation angle.

FIG. 15 is a graph illustrating the relationship between the distance (the horizontal angle of view) from the center 218 of the display input unit 120 and a pan rotation angle. A touch centering instruction region for achieving a touch centering function is provided in a central portion including the center 218 of the display input unit 120, the pan intermediate instruction regions 272 are provided in the other region, and the predetermined pan angle rotation instruction regions 210 are provided in the other region. As illustrated in FIG. 15, in the pan intermediate instruction region 272, the intermediate pan angle is set in the range that is greater than the maximum pan angle output from the touch centering instruction unit 202 and is less than a predetermined pan angle such that the pan angle increases as the distance from the center 218 of the display input unit 120 increases. Therefore, the intermediate pan angle is changed depending on the distance from the center 218 of the display input unit 120 to accurately perform the pan operation of the pan/tilt mechanism 32.

As described above, in this embodiment, the pan/tilt mechanism 32 can be operated at the intermediate pan angle and the intermediate tilt angle. Therefore, it is possible to accurately operate the imaging device 10.

The embodiments of the invention have been described above. However, the invention is not limited to the above-described embodiments and various modifications and changes of the invention can be made without departing from the scope and spirit of the invention.

EXPLANATION OF REFERENCES

10: imaging device
12: device body
14: base
16: holding portion
16A: gear
18: dome cover
19: imaging start button
20: imaging unit
22: imaging lens
23: diaphragm
24: imaging element
26: lens driving unit
28: CMOS driver
30: pan/tilt device
32: pan/tilt mechanism
34: pan driving unit
36: tilt driving unit
40: control unit
41: signal processing unit
42: imaging control unit
43: lens control unit
44: pan/tilt control unit
46: camera work control unit
50: wireless communication unit
60: operating unit
61: camera-side display unit
62: memory
100: smart phone
101: main control unit
102: housing
110: wireless communication unit
120: display input unit
121: display panel
122: operation panel
130: calling unit
131: speaker
132: microphone
140: operating unit
141: camera unit
150: storage unit
151: internal storage unit
152: external storage unit
160: external input/output unit
170: GPS receiving unit
180: motion sensor unit
190: power supply unit
200: instruction unit
202: touch centering instruction unit
204: predetermined pan angle rotation instruction unit
206: predetermined tilt angle rotation instruction unit
210: predetermined pan angle rotation instruction region
212: predetermined tilt angle rotation instruction region
214: touch centering detection region

What is claimed is:

1. An imaging device operation device which manually pans and tilts an imaging device comprising an imaging unit including an imaging lens and an imaging element and a pan/tilt mechanism that rotates the imaging unit in a horizontal direction and a vertical direction with respect to a device body, comprising:

a display unit;

a touch panel which detects coordinates of a touch position on the display unit and in which a touch centering detection region is set in a central portion of a region corresponding to the display unit on which a live view image captured by the imaging unit is displayed, predetermined pan angle rotation instruction regions are set on the left and right sides of the touch centering detection region, and predetermined tilt angle rotation instruction regions are set on the upper and lower sides of the touch centering detection region;

a display control unit that outputs the live view image to the display unit;

a touch centering instruction unit that outputs an instruction to pan and tilt the pan/tilt mechanism such that a point corresponding to the detected coordinates on the live view image is located at the center of the live view image when the coordinates of the touch position in the touch centering detection region are detected;

a predetermined pan angle rotation instruction unit that outputs an instruction to pan the pan/tilt mechanism at a predetermined pan angle when the coordinates of the touch position in the predetermined pan angle rotation instruction regions are detected; and a predetermined tilt angle rotation instruction unit that outputs an instruction to tilt the pan/tilt mechanism at a predetermined tilt angle when the coordinates of the touch position in the predetermined tilt angle rotation instruction regions are detected.

2. The imaging device operation device according to claim 1, further comprising:

a zoom value acquisition unit that acquires a zoom value of an optical zoom of the imaging unit or a zoom value of an electronic zoom of the live view image; and a first angle change unit that changes the predetermined pan angle and the predetermined tilt angle according to the zoom value acquired by the zoom value acquisition unit, wherein the predetermined pan angle rotation instruction unit outputs an instruction to pan the pan/tilt mechanism at the predetermined pan angle changed by the first angle change unit, and the predetermined tilt angle rotation instruction unit outputs an instruction to tilt the pan/tilt mechanism at the predetermined tilt angle changed by the first angle change unit.

3. The imaging device operation device according to claim 1, further comprising:

a touch history storage unit that stores a history of touches detected in the predetermined pan angle rotation instruction regions and the predetermined tilt angle rotation instruction regions; and a second angle change unit that changes the predetermined pan angle and the predetermined tilt angle according to the history of the touches stored in the touch history storage unit, wherein the predetermined pan angle rotation instruction unit outputs an instruction to pan the pan/tilt mechanism at the predetermined pan angle changed by the second angle change unit, and the predetermined tilt angle rotation instruction unit outputs an instruction to tilt the pan/tilt mechanism at the predetermined tilt angle changed by the second angle change unit.

4. The imaging device operation device according to claim 1, wherein first dead regions are set between the touch centering detection region and the predetermined pan angle rotation instruction regions and between the touch centering detection region and the predetermined tilt angle rotation instruction regions in the touch panel.

5. The imaging device operation device according to claim 1, further comprising:

a pan intermediate instruction unit; and a tilt intermediate instruction unit, wherein pan intermediate instruction regions are set between the touch centering detection region and the predetermined pan angle rotation instruction regions and tilt intermediate instruction regions are set between the touch centering detection region and the predetermined tilt angle rotation instruction regions in the touch panel, when the coordinates of the touch position in the pan intermediate instruction region are detected, the pan intermediate instruction unit outputs an instruction to pan the pan/tilt mechanism at an intermediate pan angle that is greater than a maximum pan angle instructed by the touch centering instruction unit and is less than the predetermined pan angle, and when the coordinates of the touch position in the tilt intermediate instruction region are detected, the tilt intermediate instruction unit outputs an instruction to tilt the pan/tilt mechanism at an intermediate tilt angle that is greater than a maximum tilt angle instructed by the touch centering instruction unit and is less than the predetermined tilt angle.

6. The imaging device operation device according to claim 1, wherein second dead regions are set at corners of the touch panel.

7. The imaging device operation device according to claim 1, wherein the display control unit performs control such that regions displayed on the display unit can be distinguished from each other.

8. The imaging device operation device according to claim 1, wherein, in a case in which the pan/tilt mechanism is panned in response to the instruction output from the predetermined pan angle rotation instruction unit and reaches a rotation mechanical end portion in a pan direction, the display control unit displays a warning indicating that the pan/tilt mechanism reaches the rotation mechanical end portion in the pan direction on the display unit.

9. The imaging device operation device according to claim 1, wherein, in a case in which it is determined that the pan/tilt mechanism is panned in a direction opposite to a direction instructed by an operation of the touch panel to execute an instruction received through the predetermined pan angle rotation instruction regions, the predetermined pan angle rotation instruction unit outputs an instruction to pan the pan/tilt mechanism in the opposite direction to execute the instruction received through the predetermined pan angle rotation instruction regions.

10. The imaging device operation device according to claim 1, wherein the predetermined pan angle rotation instruction region receives instructions in different ways in a case in which the predetermined pan angle rotation instruction unit outputs an instruction to pan the pan/tilt mechanism in a direction instructed by an operation of the touch panel and a case in which the predetermined pan angle rotation instruction unit outputs an instruction to pan the pan/tilt mechanism in a direction opposite to the direction instructed by the operation of the touch panel.

11. The imaging device operation device according to claim 9, wherein, in a case in which the imaging unit captures a moving image, the predetermined pan angle rotation instruction unit pans the pan/tilt mechanism only in the direction instructed by the operation of the touch panel.

12. An operation method which manually pans and tilts an imaging device comprising an imaging unit including an imaging lens and an imaging element and a pan/tilt mechanism that rotates the imaging unit in a horizontal direction and a vertical direction with respect to a device body, the method comprising:
- a display control step of outputting a live view image captured by the imaging unit to a display unit;
- a detection step of detecting coordinates of a touch position on the display unit through a touch panel in which a touch centering detection region is set in a central portion of a region corresponding to the display unit on which the live view image is displayed, predetermined pan angle rotation instruction regions are set on the left and right sides of the touch centering detection region, and predetermined tilt angle rotation instruction regions are set on the upper and lower sides of the touch centering detection region;
- a touch centering instruction step of outputting an instruction to pan and tilt the pan/tilt mechanism such that a point corresponding to the detected coordinates on the live view image is located at the center of the live view image when the coordinates of the touch position in the touch centering detection region are detected;
- a predetermined pan angle rotation instruction step of outputting an instruction to pan the pan/tilt mechanism at a predetermined pan angle when the coordinates of the touch position in the predetermined pan angle rotation instruction regions are detected; and
- a predetermined tilt angle rotation instruction step of outputting an instruction to tilt the pan/tilt mechanism at a predetermined tilt angle when the coordinates of the touch position in the predetermined tilt angle rotation instruction regions are detected.

13. A non-transitory computer-readable tangible medium recording a program that causes a computer to perform the operation method according to claim 12.

14. A non-transitory computer-readable tangible medium recording a program that causes a computer to perform an operation method which manually pans and tilts an imaging device comprising an imaging unit including an imaging lens and an imaging element and a pan/tilt mechanism that rotates the imaging unit in a horizontal direction and a vertical direction with respect to a device body, wherein the operation method includes:
- a display control step of outputting a live view image captured by the imaging unit to a display unit;
- a detection step of detecting coordinates of a touch position on the display unit through a touch panel in which a touch centering detection region is set in a central portion of a region corresponding to the display unit on which the live view image is displayed, predetermined pan angle rotation instruction regions are set on the left and right sides of the touch centering detection region, and predetermined tilt angle rotation instruction regions are set on the upper and lower sides of the touch centering detection region;
- a touch centering instruction step of outputting an instruction to pan and tilt the pan/tilt mechanism such that a point corresponding to the detected coordinates on the live view image is located at the center of the live view image when the coordinates of the touch position in the touch centering detection region are detected;
- a predetermined pan angle rotation instruction step of outputting an instruction to pan the pan/tilt mechanism at a predetermined pan angle when the coordinates of the touch position in the predetermined pan angle rotation instruction regions are detected; and
- a predetermined tilt angle rotation instruction step of outputting an instruction to tilt the pan/tilt mechanism at a predetermined tilt angle when the coordinates of the touch position in the predetermined tilt angle rotation instruction regions are detected.

\* \* \* \* \*